US012508811B2

(12) United States Patent
Usui et al.

(10) Patent No.: US 12,508,811 B2
(45) Date of Patent: Dec. 30, 2025

(54) PRINTING APPARATUS AND MAINTENANCE METHOD THEREFOR

(71) Applicant: SCREEN Holdings Co., Ltd., Kyoto (JP)

(72) Inventors: Kensuke Usui, Kyoto (JP); Susumu Takahashi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 68 days.

(21) Appl. No.: 18/682,837

(22) PCT Filed: Jul. 13, 2022

(86) PCT No.: PCT/JP2022/027592
§ 371 (c)(1),
(2) Date: Feb. 9, 2024

(87) PCT Pub. No.: WO2023/021892
PCT Pub. Date: Feb. 23, 2023

(65) Prior Publication Data
US 2024/0278578 A1 Aug. 22, 2024

(30) Foreign Application Priority Data
Aug. 19, 2021 (JP) ................................ 2021-134203

(51) Int. Cl.
*B41J 2/165* (2006.01)
*B41J 2/21* (2006.01)
(Continued)

(52) U.S. Cl.
CPC ......... *B41J 2/16579* (2013.01); *B41J 2/1652* (2013.01); *B41J 2/2135* (2013.01);
(Continued)

(58) Field of Classification Search
CPC .. B41J 2/16579; B41J 2/2135; B41J 11/0025; B65H 19/18
See application file for complete search history.

(56) References Cited

U.S. PATENT DOCUMENTS 8,757,757 B2 * 6/2014 Takeuchi .............. B41J 11/008 347/14
8,926,048 B2 * 1/2015 Naito .................. B41J 2/16526 347/16
(Continued)

FOREIGN PATENT DOCUMENTS

JP 2011-152689 A 8/2011
JP 2012-080346 A 4/2012
WO 2015/163087 A1 10/2015

OTHER PUBLICATIONS

International Search Report received in PCT Application No. PCT/JP2022/027592 dated Aug. 23, 2022.

*Primary Examiner* — Sharon Polk
(74) *Attorney, Agent, or Firm* — Rimon P.C.

(57) ABSTRACT

A printing apparatus is achieved that has an auto-splice function and is capable of performing, when roll paper is replaced, suitable maintenance taking into account a print process scheduled to be executed after replacement of the roll paper. When a splicer replaces, regarding the roll paper to be used, the preceding roll paper with the subsequent roll paper, a print control unit controls an operation of a printing unit such that an inspection pattern is printed at a tail of continuous paper unwound from the preceding roll paper, and a maintenance content control unit determines maintenance content for an inkjet head in accordance with a criterion suitable for printing on continuous paper unwound from the subsequent roll paper based on an inspection result obtained by inspection of a print image for the inspection pattern.

17 Claims, 14 Drawing Sheets

(51) Int. Cl.
*B41J 11/00* (2006.01)
*B65H 19/18* (2006.01)

(52) U.S. Cl.
CPC .......... *B41J 11/0025* (2013.01); *B65H 19/18* (2013.01); *B41J 2002/16573* (2013.01)

(56) References Cited

U.S. PATENT DOCUMENTS

| | | | | |
|---|---|---|---|---|
| 9,195,921 | B2 * | 11/2015 | Fukuda ................ | G06K 15/022 |
| 2011/0181652 | A1 | 7/2011 | Komatsu | |
| 2011/0234720 | A1 | 9/2011 | Valenti, Jr. et al. | |
| 2017/0021631 | A1 | 1/2017 | Ono | |

* cited by examiner

PRINTING APPARATUS AND MAINTENANCE METHOD THEREFOR

CROSS-REFERENCE TO RELATED APPLICATIONS

This application is the U.S. National Phase under 35 U.S.C. § 371 of International Application No. PCT/JP2022/027592, filed on Jul. 13, 2022, which claims the benefit of foreign priority to Japanese Patent Application No. 2021-134203 filed on Aug. 19, 2021, the entire contents of each of which are hereby incorporated by reference.

TECHNICAL FIELD

The present invention relates to a printing apparatus and a maintenance method therefor.

BACKGROUND ART

There has been known an inkjet printing apparatus that performs printing by ejecting ink onto a base material (print medium) such as print paper. In the inkjet printing apparatus, when an interval between ejections is long, drying of ink due to evaporation of solvent near a nozzle, mixing of air bubbles into the nozzle, adhesion of dust to the nozzle, or the like may occur in a period during which printing is performed. When such a phenomenon occurs, normal ejection or the like cannot be performed, and printing failure may occur. Therefore, maintenance for avoiding such a problem is performed at any time.

Maintenance is broadly classified into cleaning, such as wiping (wiping the dirt off) the nozzle surface of an inkjet head (printhead) with a dedicated mechanism, and flushing, in which an ink ejecting operation unrelated to the print content is forcibly performed. Flushing can be performed while the print paper is being conveyed, but cleaning needs to be performed while conveyance of the print paper is stopped. There are various types of flushing methods, and the following are known: star flushing (discrete flushing) in which ink is ejected to form a thin layer of ink on the entire page to be printed; line flushing in which ink is simultaneously ejected from a plurality of nozzles on a predetermined row of a certain page; and other types.

Regarding the maintenance as described above, Japanese Laid-Open Patent Publication No. 2011-152689 discloses a printing apparatus that determines whether an ejection state is a normal state, a clogged state, or an unstable ejection state based on an actual measurement value indicating the ejection state of ink, and performs different maintenance depending on the determination result. In the printing apparatus, for example, when it is determined that the ink ejection state is the clogged state, maintenance including an ink suction operation is performed, when it is determined that the ink ejection state is the unstable ejection state, maintenance not including the ink suction operation is performed, and when it is determined that the ink ejection state is the normal state, maintenance is not performed.

Further, WO 2015/163087 discloses a maintenance system of an inkjet recording apparatus, the maintenance system including a maintenance level determination criterion correction portion that corrects a maintenance level determination criterion for determining the content of maintenance to be performed. In the maintenance system, for example, the maintenance level determination criterion is automatically corrected based on the processing time of the job to be processed next to the current job. As a more specific example, when the processing time of the job to be processed next is longer than the processing time defined by the standard, the maintenance level determination criterion is corrected such that maintenance with high recovery capability is performed even at a low ejection abnormality level.

PRIOR ART DOCUMENTS

Patent Documents

[Patent Document 1] Japanese Laid-Open Patent Publication No. 2011-152689

[Patent Document 2] WO 2015/163087

SUMMARY OF THE INVENTION

Problems to be Solved by the Invention

In recent years, printing apparatuses having an auto-splice function have been developed. The auto-splice function is a function of automatically splicing the tail end part of the roll paper to be used currently and the start end part of the roll paper to be used next, using an adhesive tape or the like, when the remaining amount of the roll paper to be used currently becomes small. The printing apparatus having such an auto-splice function eliminates the need for manual replacement work of the roll paper, thereby reducing the printing time.

In a conventional printing apparatus, maintenance is not performed when printing is continuously performed on a plurality of rolls of paper using the auto-splice function. However, before and after the replacement of the roll paper, the head (inkjet head) to be used may vary, and the level of print quality required by a user may vary. In such a case, it is considered preferable to perform maintenance. Note that neither Japanese Laid-Open Patent Publication No. 2011-152689 nor WO 2015/163087 describes maintenance in a case where roll paper is replaced using the auto-splice function.

Therefore, an object of the present invention is to achieve a printing apparatus that has an auto-splice function and is capable of performing, when roll paper is replaced, suitable maintenance taking into account a print process scheduled to be executed after replacement of the roll paper.

Means for Solving the Problems

A first aspect of the present invention is directed to a printing apparatus including:

a printing unit including a printhead that performs printing by ejecting ink onto continuous paper unwound from roll paper;

a print control unit configured to control an operation of the printing unit;

a maintenance mechanism configured to perform maintenance of the printhead;

an inspection device configured to perform inspection of a print image obtained by printing by the printing unit;

a maintenance content control unit configured to determine maintenance content for the printhead;

a maintenance mechanism control unit configured to control an operation of the maintenance mechanism such that maintenance based on the maintenance content determined by the maintenance content control unit is performed on the printhead; and a splicing unit configured to splice a tail end part of preceding roll paper to be used currently and a start end point of subsequent roll paper to be used next, and replace, regarding roll paper to be used, the preceding roll paper with the subsequent roll paper, wherein when the splicing unit replaces, regarding roll paper to be used, the preceding roll paper with the subsequent roll paper, the print control unit controls the operation of the printing unit such that an inspection pattern is printed at a tail of continuous paper unwound from the preceding roll paper, and the maintenance content control unit determines the maintenance content for the printhead in accordance with a criterion suitable for printing on continuous paper unwound from the subsequent roll paper based on an inspection result obtained by the inspection of a print image for the inspection pattern performed by the inspection device.

According to a second aspect of the present invention, in the first aspect of the present invention, when a part of a first printhead group that is a set of printheads to be used before the splicing unit replaces roll paper is not used after the splicing unit replaces roll paper, the maintenance content control unit determines the maintenance content only for a second printhead group that is a set of printheads to be used after the splicing unit replaces the roll paper, in accordance with the criterion suitable for printing on continuous paper unwound from the subsequent roll paper.

According to a third aspect of the present invention, in the second aspect of the present invention, a defect of a printhead is detected by the inspection performed by the inspection device, and unless the second printhead group includes a printhead in which a defect has been detected by the inspection performed by the inspection device, the maintenance content control unit determines that none of the printheads is a maintenance target.

According to a fourth aspect of the present invention, in the second aspect of the present invention, when the second printhead group includes a printhead in which a defect has been detected by the inspection performed by the inspection device, the maintenance content control unit determines whether or not maintenance of the second printhead group is necessary, and in a case where it is determined that the maintenance of the second printhead group is necessary, the maintenance content control unit determines that a printhead in which a defect has been detected by the inspection performed by the inspection device in the second printhead group and a printhead in which a defect has been detected by the inspection performed by the inspection device in a third printhead group that is a set of printheads not to be used after the splicing unit replaces roll paper are maintenance targets, and in a case where it is determined that the maintenance of the second printhead group is not necessary, the maintenance content control unit determines that none of the printheads is a maintenance target.

According to a fifth aspect of the present invention, in the second aspect of the present invention, a paper width of the subsequent roll paper is narrower than a paper width of the preceding roll paper.

According to a sixth aspect of the present invention, in the second aspect of the present invention, the first printhead group is a set of printheads that are used in color printing, and the second printhead group is a set of printheads that are used in monochrome printing.

According to a seventh aspect of the present invention, in the second aspect of the present invention, the first printhead group is a set of printheads that are used in double-sided printing, and the second printhead group is a set of printheads that are used in single-sided printing.

According to an eighth aspect of the present invention, in the first aspect of the present invention, a fourth printhead group that is a set of printheads to be used after the splicing unit replaces roll paper includes a fifth printhead group that is a set of printheads to be used before the splicing unit replaces the roll paper and a sixth printhead group that is a set of printheads not to be used before the splicing unit replaces roll paper, and the maintenance content control unit determines that all the printheads included in the sixth printhead group are maintenance targets.

According to a ninth aspect of the present invention, in the eighth aspect of the present invention, the maintenance content control unit determines a printhead to be a maintenance target in accordance with the criterion suitable for printing on continuous paper unwound from the subsequent roll paper, only for the fifth printhead group.

According to a tenth aspect of the present invention, in the eighth aspect of the present invention, a paper width of the subsequent roll paper is wider than a paper width of the preceding roll paper.

According to an eleventh aspect of the present invention, in the eighth aspect of the present invention, the fifth printhead group is a set of printheads that are used in monochrome printing, and the fourth printhead group is a set of printheads that are used in color printing.

According to a twelfth aspect of the present invention, in the eighth aspect of the present invention, the fifth printhead group is a set of printheads that are used in single-sided printing, and the fourth printhead group is a set of printheads that are used in double-sided printing.

According to a thirteenth aspect of the present invention, in the first aspect of the present invention, the criterion is defined for each job, and the maintenance content control unit determines a printhead to be a maintenance target in accordance with a criterion that maximizes the number of printheads determined as maintenance targets, among criteria defined for a plurality of jobs for which printing is to be performed by the printing unit after the splicing unit replaces, regarding roll paper to be used, the preceding roll paper with the subsequent roll paper and before the splicing unit further replaces, regarding roll paper to be used, the subsequent roll paper with a next roll paper.

According to a fourteenth aspect of the present invention, in the first aspect of the present invention, the print control unit controls the operation of the printing unit such that an inspection pattern is printed at a head of continuous paper unwound from the subsequent roll paper, and the maintenance content control unit further determines whether or not to stop printing by the printing unit on continuous paper unwound from the subsequent roll paper based on an inspection result obtained by the inspection, that is performed by the inspection device, of a print image for the inspection pattern printed at head of continuous paper unwound from the subsequent roll paper.

According to a fifteenth aspect of the present invention, in the first aspect of the present invention, cleaning and flushing are prepared as types of maintenance of the plurality of printheads, and the maintenance content control unit further determines a type of maintenance to be performed in accordance with the criterion suitable for printing on continuous paper unwound from the subsequent roll paper.

According to a sixteenth aspect of the present invention, in the first aspect of the present invention, the splicing unit outputs a splice trigger signal that triggers replacement of roll paper when a remaining amount of the preceding roll paper becomes equal to or less than a predetermined threshold, and the print control unit controls the operation of the printing unit based on the splice trigger signal such that an inspection pattern is printed at a tail of continuous paper unwound from the preceding roll paper.

A seventeenth aspect of the present invention is directed to a maintenance method of a printing apparatus that includes a printing unit including a printhead that performs printing by ejecting ink onto continuous paper unwound from roll paper, and a splicing unit configured to splice a tail end part of preceding roll paper to be used currently and a start end part of subsequent roll paper to be used next, and replace, regarding roll paper to be used, the preceding roll paper with the subsequent roll paper, the maintenance method including:

an inspection pattern printing step of printing, by the printing unit, an inspection pattern at a tail of continuous paper unwound from the preceding roll paper;

an inspection step of performing inspection of a print image for the inspection pattern;

a roll paper replacement step of replacing, by the splicing unit, the preceding roll paper with the subsequent roll paper, regarding roll paper to be used;

a maintenance content control step of determining maintenance content for the printhead in accordance with a criterion suitable for printing on continuous paper unwound from the subsequent roll paper based on an inspection result obtained by the inspection in the inspection step; and a maintenance step of performing maintenance based on the maintenance content determined in the maintenance content control step on the printhead.

Effects of the Invention

According to the first aspect of the present invention, a printing apparatus having an auto-splice function is provided with a maintenance mechanism that performs maintenance of a printhead, a maintenance content control unit that determines maintenance content for the printhead, and a maintenance mechanism control unit that controls the operation of the maintenance mechanism such that the maintenance based on the maintenance content determined by the maintenance content control unit is performed. Then, when the roll paper to be used is replaced, the maintenance content control unit determines the maintenance content for the printhead in accordance with a criterion suitable for printing on continuous paper unwound from the roll paper after replacement based on the inspection result for the inspection pattern. As a result, when the roll paper is replaced, maintenance is performed on the printhead depending on the print process to be executed after the replacement. As above, the printing apparatus is achieved that has the auto-splice function and is capable of performing, when the roll paper is replaced, suitable maintenance taking into account the print process scheduled to be executed after replacement of the roll paper.

According to the second aspect of the present invention, in a case where some of the printheads to be used before replacement of the roll paper will not be used after replacement of the roll paper, the need for maintenance of each printhead to be used after replacement of the roll paper is suitably determined.

According to the third aspect of the present invention, the printing time is reduced by preventing maintenance from being performed more than necessary.

According to the fourth aspect of the present invention, when maintenance is performed on the printhead to be used after replacement of the roll paper, maintenance is performed on the printhead not to be used after replacement of the roll paper together. Accordingly, maintenance is efficiently performed. In addition, when maintenance is not performed on the printhead to be used after replacement of the roll paper, maintenance is not performed on the printhead not to be used after replacement of the roll paper. Thus, the printing time is reduced by preventing maintenance from being performed more than necessary.

According to the fifth aspect of the present invention, when roll paper having a wide width is replaced with roll paper having a narrow width, suitable maintenance corresponding to the print process on narrow continuous paper is performed.

According to the sixth aspect of the present invention, when color printing is switched to monochrome printing at the replacement of the roll paper, suitable maintenance is performed, taking into account the execution of monochrome printing.

According to the seventh aspect of the present invention, when double-sided printing is switched to single-sided printing at the replacement of the roll paper, suitable maintenance is performed taking into account the execution of single-sided printing.

According to the eighth aspect of the present invention, since maintenance is reliably performed on the printhead that changes from the non-use state to the used state at the replacement of the roll paper, the occurrence of ejection failure of the printhead that has been in the non-use state is effectively inhibited.

According to the ninth aspect of the present invention, the need for maintenance is suitably determined for each printhead maintained in the use state throughout a period before and after replacement of the roll paper.

According to the tenth aspect of the present invention, when roll paper having a narrow width is replaced with roll paper having a wide width, suitable maintenance corresponding to the print process on continuous paper having a wide width is performed.

According to the eleventh aspect of the present invention, when monochrome printing is switched to color printing at the replacement of the roll paper, suitable maintenance is performed, taking into account the execution of color printing.

According to the twelfth aspect of the present invention, when single-sided printing is switched to double-sided printing at the replacement of the roll paper, suitable maintenance is performed, taking into account the execution of double-sided printing.

According to the thirteenth aspect of the present invention, in a case where a plurality of jobs are print targets in a period from when the roll paper is replaced to when the roll paper is replaced next, the occurrence of ejection failure of a printhead to be used for printing of the plurality of jobs is effectively inhibited.

According to the fourteenth aspect of the present invention, it is possible to effectively inhibit the occurrence of printing failure after replacement of the roll paper.

According to the fifteenth aspect of the present invention, by appropriately using cleaning and flushing, it is possible to inhibit a decrease in printing efficiency while maintaining printing quality.

According to the sixteenth aspect of the present invention, it is possible to automatically perform not only the splicing of the tail end part of the preceding roll paper and the start end part of the subsequent roll paper but also the printing of the inspection pattern.

According to the seventeenth aspect of the present invention, the same effect as that of the first aspect of the present invention can be obtained.

MODES FOR CARRYING OUT THE INVENTION

Embodiments of the present invention will be described below with reference to the accompanying drawings.

1. First Embodiment

<1.1 Overall Configuration of Printing System>

Figure 1:
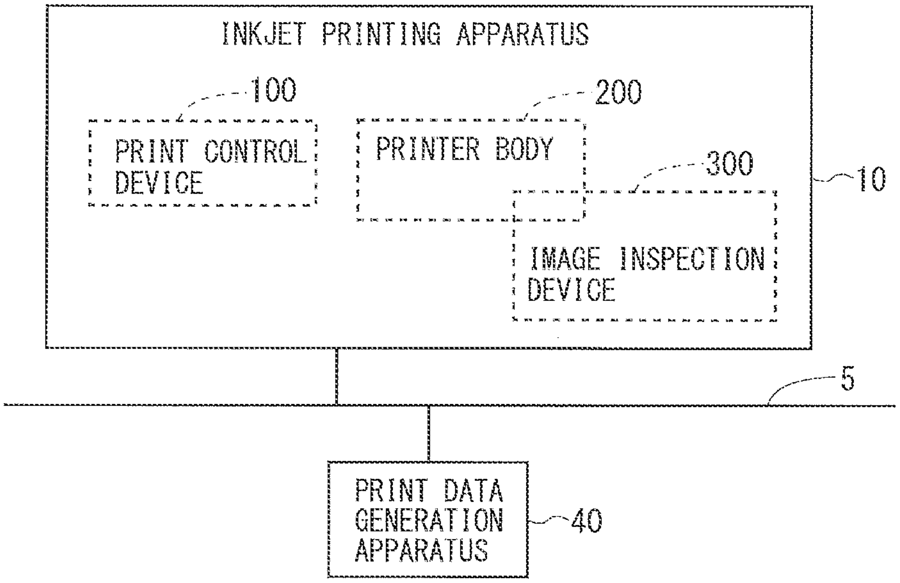
FIG. 1 is an overall configuration diagram of a printing system according to a first embodiment of the present invention.

FIG. 1 is an overall configuration diagram of a printing system according to a first embodiment of the present invention. The printing system includes an inkjet printing apparatus 10 and a print data generation apparatus 40. The inkjet printing apparatus 10 and the print data generation apparatus 40 are connected to each other through a communication line 5. The print data generation apparatus 40 generates print data by performing raster image processor (RIP) processing or the like on submitted data, such as a portable document format (PDF) file. The print data generated by the print data generation apparatus 40 is transmitted to the inkjet printing apparatus 10 through the communication line 5. The inkjet printing apparatus 10 outputs a print image to print paper as a print medium based on print data transmitted from the print data generation apparatus 40 without using a printing plate. The inkjet printing apparatus 10 includes a printer body 200, a print control device 100 for controlling the operation of the printer body 200, and an image inspection device 300 for inspecting a printing state. That is, the inkjet printing apparatus 10 is a printing apparatus with an inspection function. Some components of the image inspection device 300 are incorporated in the printer body 200.

Although the image inspection device 300 is a component of the inkjet printing apparatus 10 (i.e., the image inspection device 300 is included in the inkjet printing apparatus 10) in the configuration shown in FIG. 1, the present invention is not limited thereto. The image inspection device 300 may be a single apparatus independent of the inkjet printing apparatus 10.

<1.2 Configuration of Inkjet Printing Apparatus>

Figure 2:
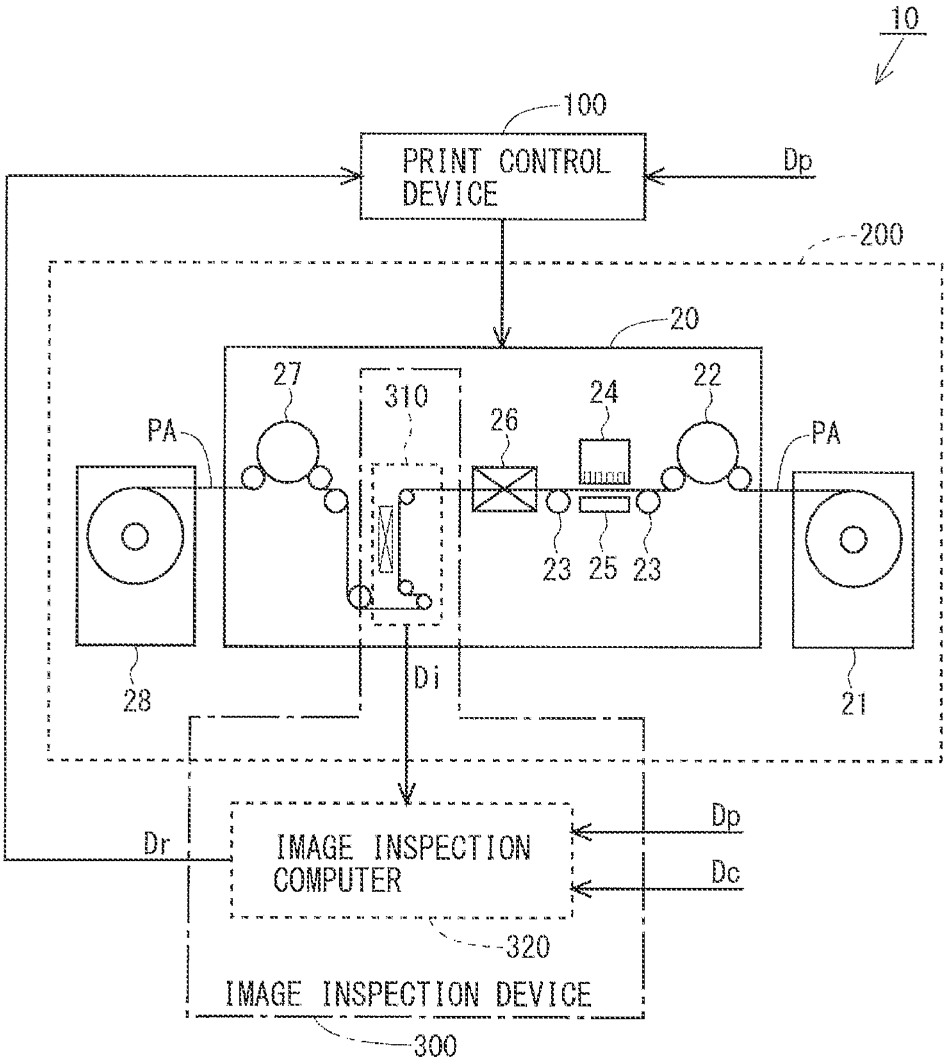
FIG. 2 is a schematic diagram showing a configuration example of an inkjet printing apparatus according to the first embodiment.

FIG. 2 is a schematic diagram showing a configuration example of the inkjet printing apparatus 10. As described above, the inkjet printing apparatus 10 includes the print control device 100, the printer body 200, and the image inspection device 300.

The printer body 200 includes a paper feeding unit 21 for supplying print paper (roll paper) PA, a printing mechanism 20 for performing printing on the print paper PA, and a paper winding unit 28 for winding the print paper PA after printing. The printing mechanism 20 includes a first drive roller 22 for conveying the print paper PA to its inside, a plurality of support rollers 23 for conveying the print paper PA inside the printing mechanism 20, a printing unit 24 for performing printing by ejecting ink onto the print paper PA, a cleaning mechanism 25 for performing cleaning (e.g., suction of ink from the nozzle described later or wiping of the nozzle surface) of the printing unit 24, a drying unit 26 for drying the print paper PA after printing, an imaging unit 310 for capturing a print image (print paper PA after printing), and a second drive roller 27 for outputting the print paper PA from the inside of the printing mechanism 20. The imaging unit 310 is a component of the image inspection device 300 and is configured using an image sensor such as a charged coupled device (CCD) or a complementary metal-oxide semiconductor (CMOS).

The print control device 100 controls the operation of the printer body 200 having the configuration as above. When a printout instruction command is given to the print control device 100, the print control device 100 controls the operation of the printer body 200 such that the print paper PA is conveyed from the paper feeding unit 21 to the paper winding unit 28. Then, first, printing is performed on the print paper PA by the printing unit 24, next, the print paper PA is dried by the drying unit 26, and finally, a print image is captured by the imaging unit 310. When necessary, the cleaning mechanism 25 cleans the printing unit 24.

The image inspection device 300 includes the imaging unit 310 and an image inspection computer 320. Captured image data Di obtained by capturing the print image performed by the imaging unit 310 is transmitted to the image inspection computer 320. The image inspection computer 320 performs an inspection for detecting a defect (missing) by performing image analysis on the captured image data Di. Note that the present invention is not limited to such a method, and inspection for detecting a defect (missing) or the like may be performed by comparing and collating the captured image data Di with print data Dp transmitted from the print data generation apparatus 40 or by comparing and collating the captured image data Di with inspection image data Dc. An inspection result Dr obtained by the image inspection computer 320 is transmitted to the print control device 100.

Figure 3:
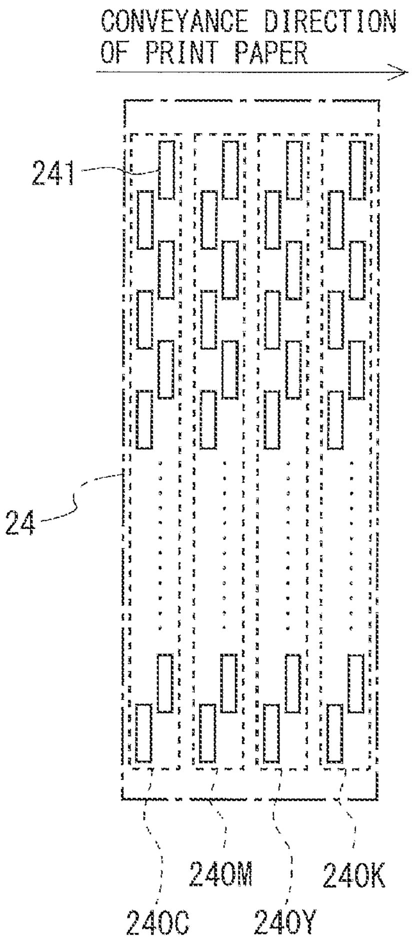
FIG. 3 is a plan view showing a configuration example of a printing unit in the first embodiment.

FIG. 3 is a plan view showing a configuration example of the printing unit 24. As shown in FIG. 3, the printing unit 24 includes inkjet head rows 240C, 240M, 240Y, and 240K of cyan color (C color), magenta color (M color), yellow color (Y color), and black color (K color) arranged in a row in the conveyance direction of the print paper PA. Each inkjet head row includes a plurality of inkjet heads (printheads) 241 arranged in a staggered manner. Each inkjet head 241 includes many nozzles for ejecting ink. Each nozzle of the inkjet heads 241 included in the inkjet head row 240C of C color ejects C color ink, each nozzle of the inkjet heads 241 included in the inkjet head row 240M of M color ejects M color ink, each nozzle of the inkjet heads 241 included in the inkjet head row 240Y of Y color ejects Y color ink, and each nozzle of the inkjet heads 241 included in the inkjet head row 240K of K color ejects K color ink.

Figure 4:
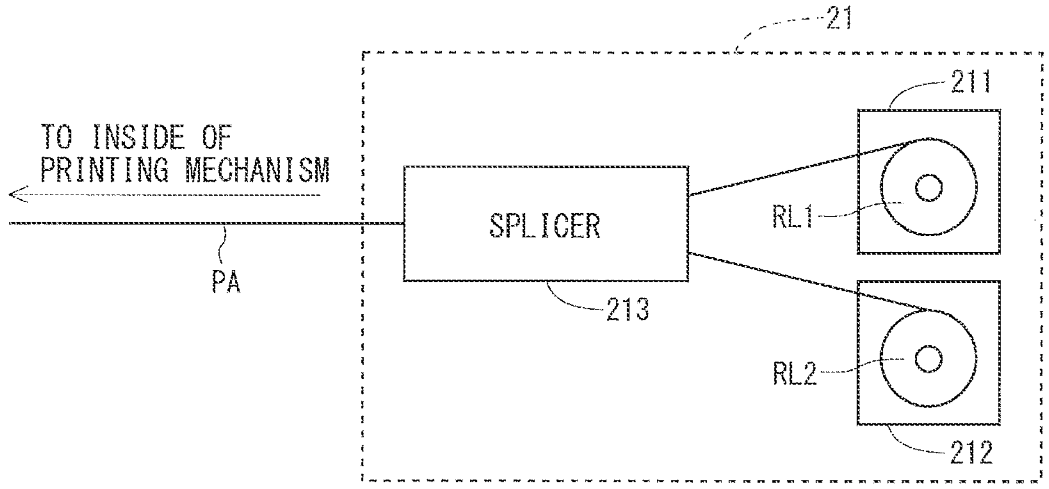
FIG. 4 is a block diagram for describing a configuration related to an auto-splice function in the first embodiment.

Meanwhile, the inkjet printing apparatus 10 has the auto-splice function described above. Therefore, as shown in FIG. 4, the paper feeding unit 21 includes two unwinding units 211, 212 and a splicer (splicing unit) 213. For example, when the remaining amount of roll paper RL1 unwound from the unwinding unit 211 becomes small, the splicer 213 splices the tail end part of the roll paper RL1 and the start end part of roll paper RL2 unwound from the unwinding unit 212 using an adhesive tape or the like. As a result, the print paper used for printing is changed from the roll paper RL1 to the roll paper RL2. In this manner, in the inkjet printing apparatus 10 according to the present embodiment, the roll paper to be used can be replaced without stopping the conveyance of the print paper PA.

Although the configuration of the inkjet printing apparatus 10 for performing color printing has been exemplified here, the present invention can also be applied to a case where an inkjet printing apparatus for performing monochrome printing is employed. Although the configuration of the inkjet printing apparatus 10 using the aqueous ink has been exemplified here, the present invention can also be applied to a case where an inkjet printing apparatus using ultraviolet (UV) ink (ultraviolet curing ink) such as an inkjet printing apparatus for label printing is employed. As above, the type of the printing apparatus is not particularly limited as long as the printing apparatus has the auto-splice function and includes the printing unit that ejects ink and requires cleaning.

<1.3 Hardware Configuration of Print Control Device>

Figure 5:
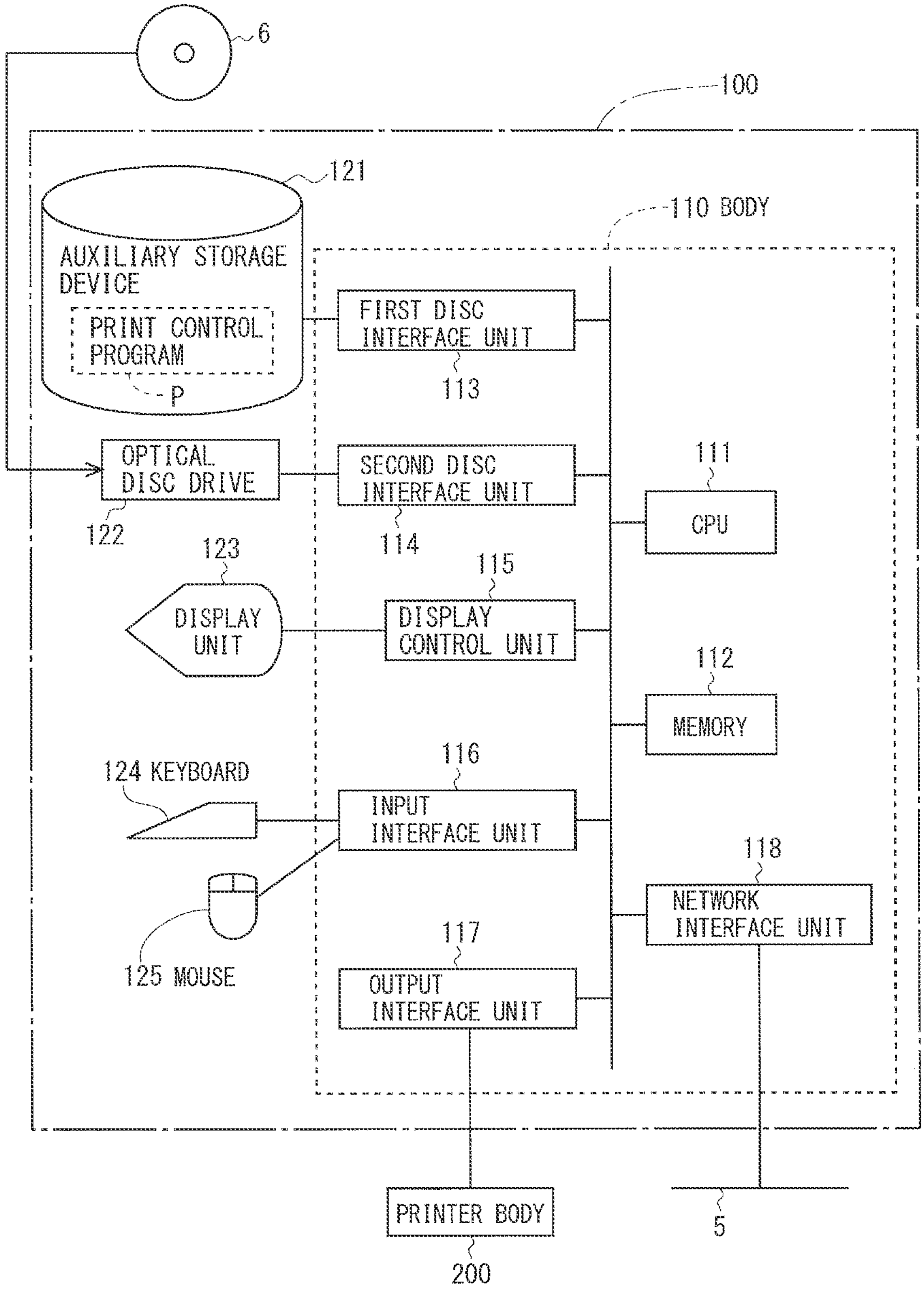
FIG. 5 is a block diagram showing a hardware configuration of a print control device according to the first embodiment.

FIG. 5 is a block diagram showing a hardware configuration of the print control device 100. As shown in FIG. 5, the print control device 100 includes a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, an output interface unit 117, and a network interface unit 118. The CPU 111, the memory 112, the first disc interface unit 113, the second disc interface unit 114, the display control unit 115, the input interface unit 116, the output interface unit 117, and the network interface unit 118 are connected to each other via a system bus. The auxiliary storage device 121 is connected to the first disc interface unit 113. The optical disc drive 122 is connected to the second disc interface unit 114. The display unit (display device) 123 is connected to the display control unit 115. The keyboard 124 and the mouse 125 are connected to the input interface unit 116. The printer body 200 is connected to the output interface unit 117 via a communication cable. The communication line 5 is connected to the network interface unit 118. The auxiliary storage device 121 is a magnetic disk device or the like. An optical disc 6 as a computer-readable recording medium such as a compact disc read-only memory (CD-ROM) or a digital versatile disc read-only memory (DVD-ROM) is inserted into the optical disc drive 122. The display unit 123 is a liquid crystal display or the like. The display unit 123 is used to display information desired by an operator. The keyboard 124 and the mouse 125 are used by the operator to input instructions to the print control device 100.

The auxiliary storage device 121 stores a print control program (a program for controlling the execution of the print process by the printer body 200) P. The CPU 111 reads the print control program P stored in the auxiliary storage device 121 into the memory 112 and executes the program to achieve various functions of the print control device 100. The memory 112 includes a random-access memory (RAM) and a read-only memory (ROM). The memory 112 functions as a work area for the CPU 111 to execute the print control program P stored in the auxiliary storage device 121. Note that the print control program P is provided by being stored into the computer-readable recording medium (non-transitory recording medium). That is, for example, a user purchases the optical disc 6 as the recording medium of the print control program P, inserts the optical disc 6 into the optical disc drive 122, reads the print control program P from the optical disc 6, and installs the print control program P in the auxiliary storage device 121. Alternatively, the print control program P transmitted via the communication line 5 may be received by the network interface unit 118 and installed in the auxiliary storage device 121.

<1.4 Control Unit>

Figure 6:
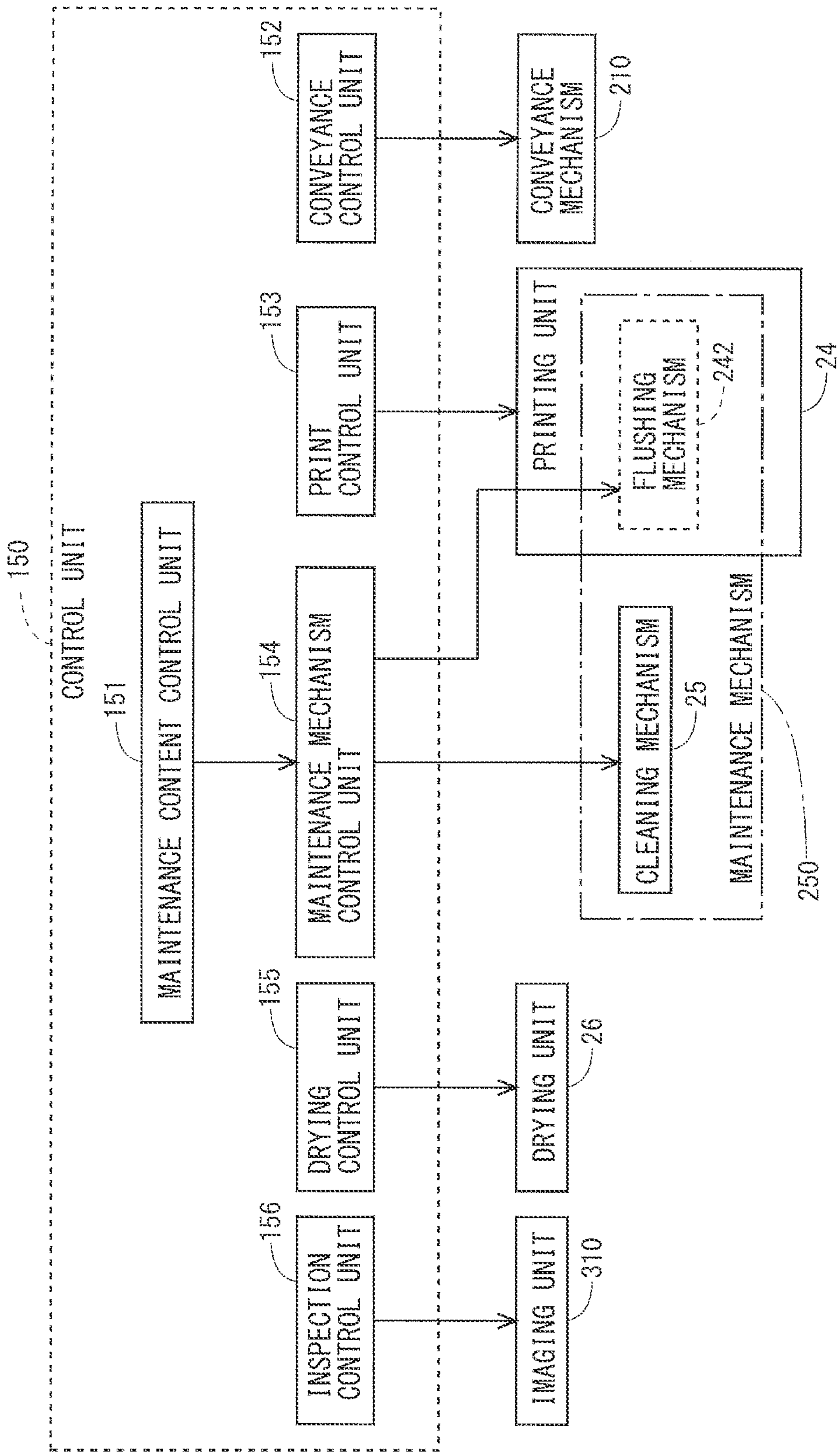
FIG. 6 is a block diagram showing a schematic functional configuration of a control unit in the first embodiment.

FIG. 6 is a block diagram showing a schematic functional configuration of a control unit 150 achieved by the print control device 100 executing the print control program P. The control unit 150 schematically includes a maintenance content control unit 151, a conveyance control unit 152, a print control unit 153, a maintenance mechanism control unit 154, a drying control unit 155, and an inspection control unit 156.

The maintenance content control unit 151 determines the content of maintenance of the printing unit 24 (more specifically, the inkjet head 241) based on the result of the inspection by the image inspection device 300 (the inspection result Dr obtained by the image inspection computer 320). Note that the maintenance content control unit 151 will be described later in further detail.

The conveyance control unit 152 controls the speed (conveyance speed) at which a conveyance mechanism 210 conveys the print paper PA. Note that, in the present embodiment, the conveyance mechanism 210 is implemented by the paper feeding unit 21, the first drive roller 22, the plurality of support rollers 23, the second drive roller 27, and the paper winding unit 28 (cf. FIG. 2).

The print control unit 153 controls the ejection of ink from each of the nozzles included in the inkjet heads 241 constituting the printing unit 24. For example, the ink ejection timing and the ink ejection amount are controlled.

The maintenance mechanism control unit 154 controls an operation of a maintenance mechanism 250 in accordance with the content of maintenance determined by the maintenance content control unit 151. In this regard, the maintenance mechanism 250 includes a cleaning mechanism 25 that performs cleaning on the inkjet head 241 and a flushing mechanism 242 that performs flushing. The flushing mechanism 242 is included in the printing unit 24.

The drying control unit 155 controls a temperature (drying temperature) when the drying unit 26 dries the print paper PA. The inspection control unit 156 controls the timing for the imaging unit 310 to capture the print image.

<1.5 Maintenance Control>

As described above, the inkjet printing apparatus 10 according to the present embodiment has the auto-splice function. In a conventional inkjet printing apparatus, maintenance is not performed when roll paper is replaced using the auto-splice function. On the other hand, in the inkjet printing apparatus 10 according to the present embodiment, maintenance is performed on the inkjet head 241 when the roll paper is replaced using the auto-splice function. The control of that maintenance will be described in detail below.

Note that, in the following description, roll paper currently in use (roll paper to be used currently) is referred to as "preceding roll paper", and roll paper to be used next is referred to as "subsequent roll paper". Print paper in a state of continuous paper unwound from the preceding roll paper is referred to as "preceding print paper", and print paper in a state of continuous paper unwound from the subsequent roll paper is referred to as "subsequent print paper".

<1.5.1 Functional Configuration Related to Maintenance>

Figure 7:
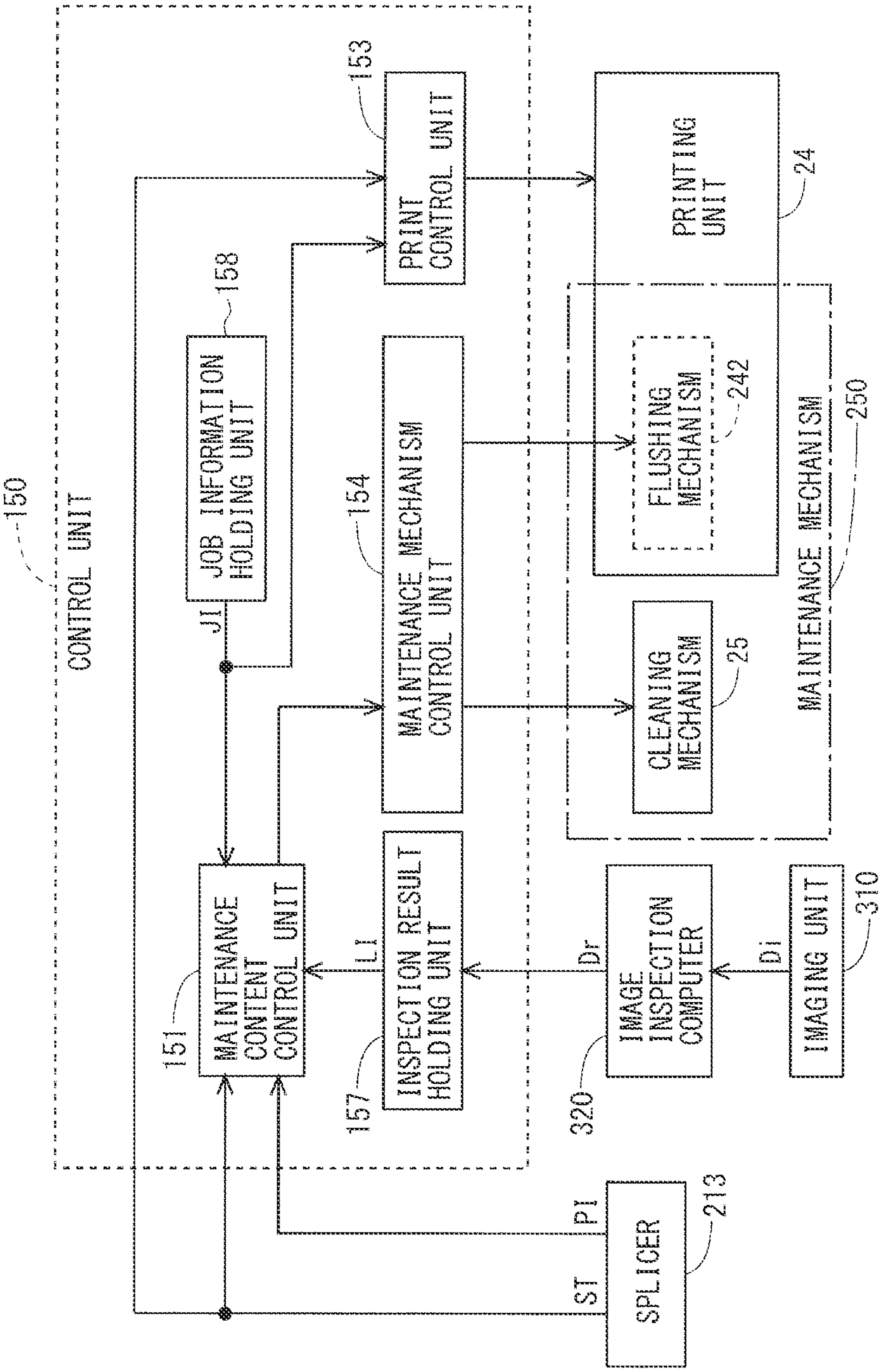
FIG. 7 is a block diagram showing a functional configuration related to maintenance in the first embodiment.

FIG. 7 is a block diagram showing a functional configuration related to maintenance. The control unit 150 is provided with an inspection result holding unit 157 and a job information holding unit 158 as components related to maintenance, in addition to the maintenance content control unit 151, the print control unit 153, and the maintenance mechanism control unit 154 described above. The printing unit 24, the maintenance mechanism 250 (the cleaning mechanism 25 and the flushing mechanism 242), the imaging unit 310, the image inspection computer 320, and the splicer 213 are involved in maintenance.

When the remaining amount of the preceding roll paper becomes small, a splice trigger signal ST is outputted from the splicer 213. The splice trigger signal ST is a signal that triggers the replacement of the roll paper. When the print control unit 153 receives the splice trigger signal ST, the print control unit 153 controls the operation of the printing unit 24 such that an inspection pattern for performing inspection for a defect (a missing such as a nozzle defect) is printed at the tail of the preceding print paper. The imaging unit 310 captures the print image for the inspection pattern, and the captured image data Di obtained by the imaging is transmitted to the image inspection computer 320. The image inspection computer 320 performs inspection for detecting a defect based on the captured image data Di, and the inspection result holding unit 157 holds the inspection result Dr.

The job information holding unit 158 holds various types of information (job information JI) such as print conditions for a job for which printing is reserved. From the splicer 213, paper information PI, such as paper types and paper widths of the preceding roll paper and the subsequent roll paper, is provided to the maintenance content control unit 151. When the maintenance content control unit 151 receives the splice trigger signal ST, the maintenance content control unit 151 determines the need for maintenance, the inkjet head 241 to be a maintenance target, and the type of maintenance, based on the job information JI, the paper information PI, and defect information LI that is an inspection result related to a defect among the inspection results Dr held in the inspection result holding unit 157. The maintenance mechanism control unit 154 controls the operations of the cleaning mechanism 25 and the flushing mechanism 242 in accordance with the content determined by the maintenance content control unit 151.

In the present embodiment, a criterion is provided for determining maintenance content that includes the need for maintenance and the specification of the inkjet head 241 to be a maintenance target. As an example, the number of defects is used as a criterion. In this case, for example, a criterion such as "maintenance is required when the number of defects is three or more" is defined. In addition, the criterion changes depending on the paper type, printing conditions, and the like. For example, under the premise that a first threshold is larger than a second threshold, when paper not requiring good quality is used, a criterion such as "maintenance is required when the number of defects is equal to or larger than the first threshold" is defined, whereas when paper requiring good quality is used, a criterion such as "maintenance is required when the number of defects is equal to or larger than the second threshold" is defined. According to this example, for the same inspection result, it is more likely that maintenance is determined to be necessary in the case where paper requiring good quality is used than in the case where paper not requiring good quality is used. Regarding the level of the criterion, in the present specification, it is assumed that the higher the criterion, the higher the possibility that maintenance is determined to be necessary.

Further, in the present embodiment, regarding the maintenance when the roll paper is replaced using the auto-splice function, the inkjet head 241 to be a maintenance target is specified in accordance with a criterion suitable for printing after the replacement of the roll paper.

As above, when the splicer 213 replaces, regarding the roll paper to be used, the preceding roll paper with the subsequent roll paper, the maintenance content control unit 151 determines the inkjet head 241 to be a maintenance target in accordance with the criterion suitable for printing on the subsequent print paper (continuous paper unwound from the subsequent roll paper) based on the inspection result Dr obtained by the inspection of the print image for the inspection pattern (the inspection pattern for performing inspection for defects of the printhead including a nozzle defect) performed by the image inspection device 300. Note that, in such a case, a function may be provided to notify and store the determination content when it is assumed that the criterion suitable for printing on the preceding print paper (continuous paper unwound from the preceding roll paper) is followed.

<1.5.2 Overall Process Flow when Replacement of Roll Paper is Performed>

Figure 8:
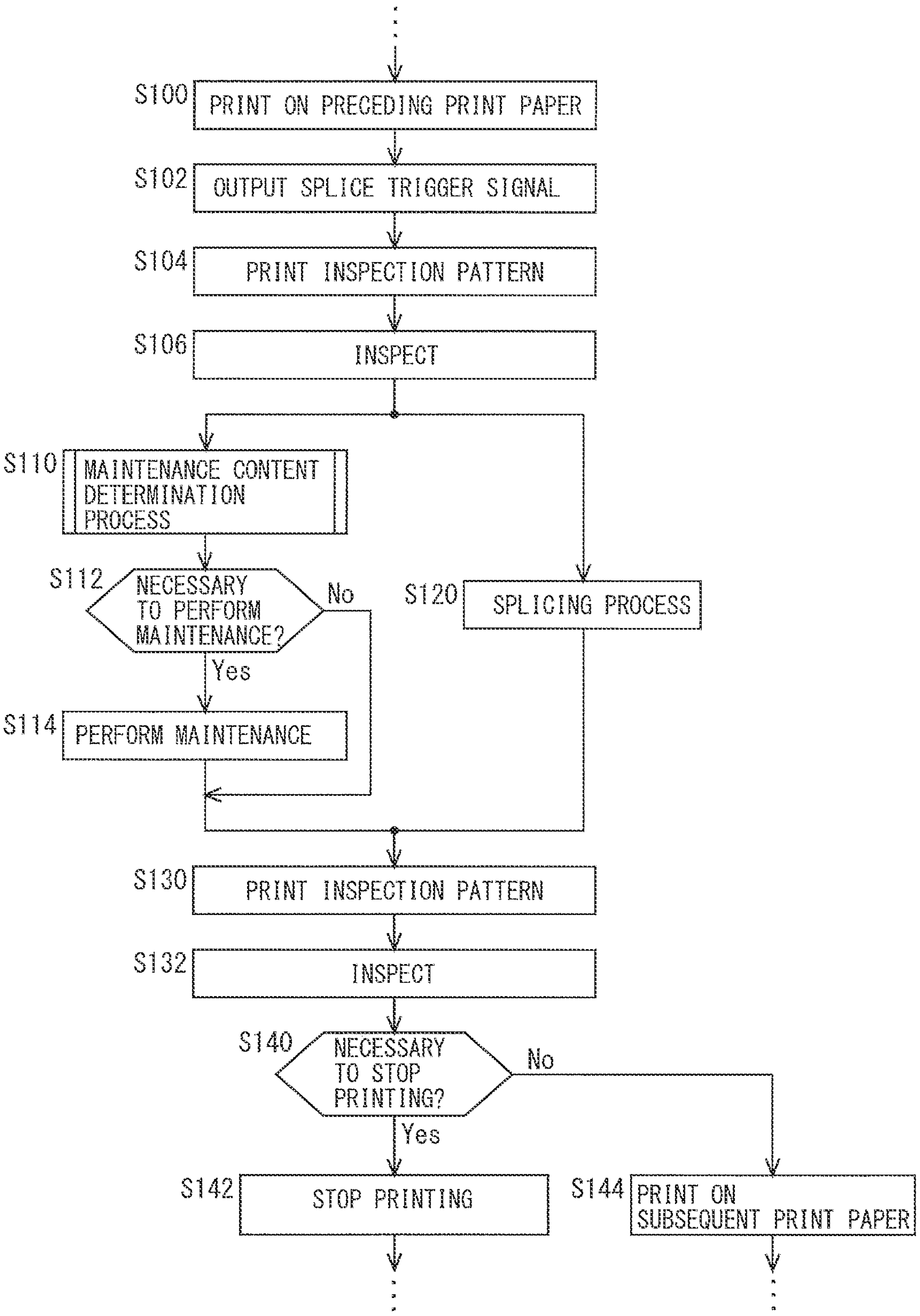
FIG. 8 is a flowchart showing an overall process flow when roll paper is replaced in the first embodiment.

With reference to a flowchart shown in FIG. 8, an overall process flow when the roll paper is replaced will be described.

When the remaining amount of the preceding roll paper becomes small in a situation where printing on the preceding print paper (step S100) is being performed, the splice trigger signal ST is outputted from the splicer 213 (step S102). In this regard, specifically, a threshold for comparison with the remaining amount of the roll paper is provided, and when the remaining amount of the preceding roll paper becomes equal to or less than the threshold, the splicer 213 outputs the splice trigger signal ST.

In response to the output of the splice trigger signal ST, the inspection pattern described above is printed at the tail of the preceding print paper (step S104). Then, the image inspection device 300 inspects the print image for the inspection pattern (step S106). As for this, first, the imaging unit 310 captures the print image obtained by the printing in step S104. Next, captured image data Di obtained by imaging performed by the imaging unit 310 is transmitted to the image inspection computer 320. Then, the image inspection computer 320 performs image analysis of the captured image data Di. In this manner, a defect is detected based on the print image for the inspection pattern. Since the inspection based on the print image for the inspection pattern printed at the tail of the preceding print paper is performed in this manner, the inspection result indicating that there is no abnormality ensures that the print result of the job executed before the replacement of the roll paper is good.

After the inspection of the print image for the inspection pattern is completed, a process of determining the need for maintenance, the inkjet head 241 to be a maintenance target, and the type of maintenance (hereinafter referred to as a "maintenance content determination process") is performed based on the inspection result (step S110). Then, it is determined whether or not maintenance is necessary (step S112). As a result, when it is determined that maintenance is necessary, the process proceeds to step S114, and when it is determined that maintenance is not necessary, the process proceeds to step S130. In step S114, the maintenance mechanism 250 performs maintenance of the inkjet head 241.

In parallel with the processes of steps S110 to S114, the roll paper is replaced (step S120). That is, the tail end part of the preceding print paper is spliced with the start end part of the subsequent print paper by the splicer 213, and the preceding roll paper is replaced with the subsequent roll paper regarding the roll paper to be used. In this manner, in step S120, the roll paper is replaced without manual operation.

In step S130, an inspection pattern is printed on the head part of the subsequent print paper. Then, the image inspection device 300 inspects the print image for the inspection pattern (step S132).

Thereafter, it is determined, based on the inspection result, whether it is necessary to stop printing (step S140). As a result, when it is determined that it is necessary to stop printing, the process proceeds to step S142, and when it is determined that it is not necessary to stop printing, the process proceeds to step S144. In step S142, printing is stopped. In this case, the conveyance of the subsequent print paper is stopped, and for example, the printing is resumed after the cleaning of the inkjet head 241 is performed. In step S144, printing on the subsequent print paper is performed.

Note that, in the present embodiment, an inspection pattern printing step is achieved by the above step S104, an inspection step is achieved by the above step S106, a maintenance content control step is achieved by the above step S110, a maintenance step is achieved by the above step S114, and a roll paper replacement step is achieved by the above step S120.

<1.5.3 Maintenance Content Determination Process>

Figure 9:
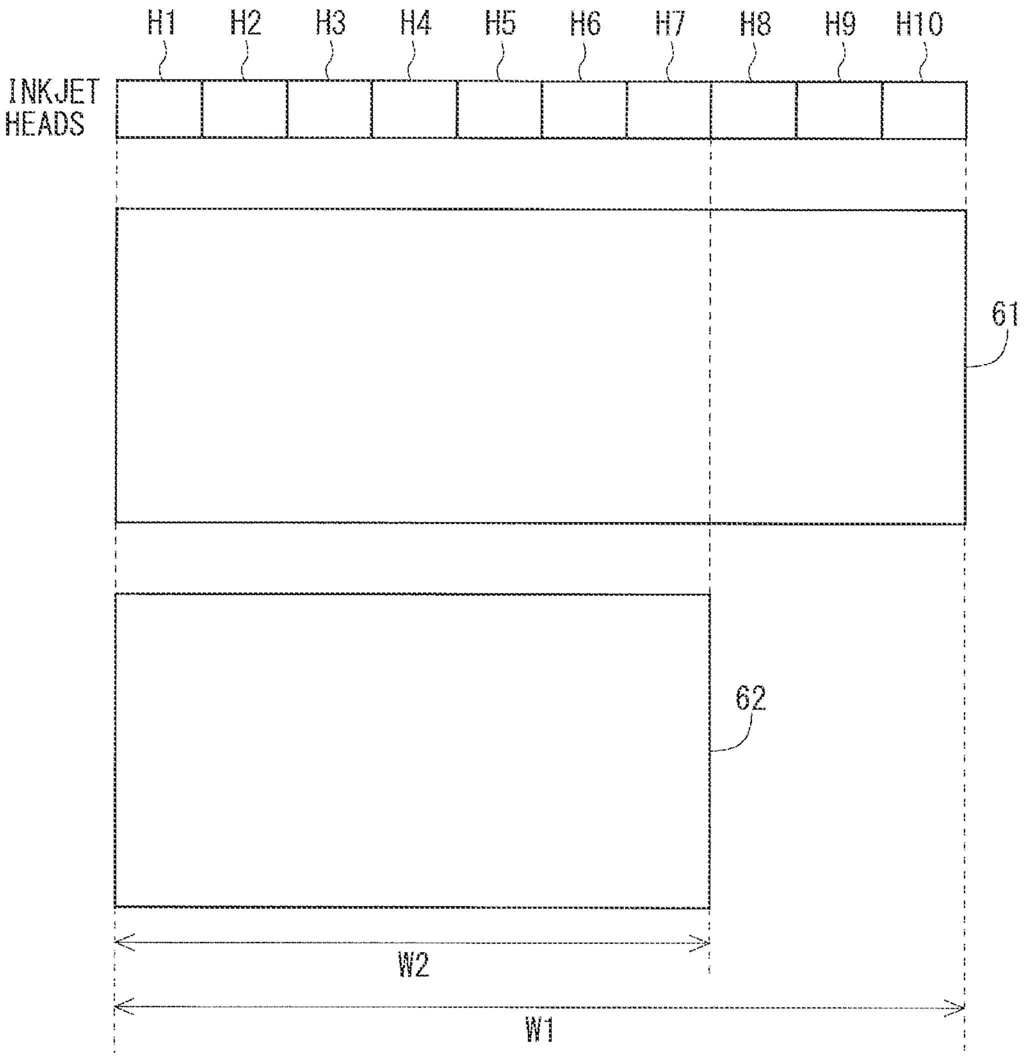
FIG. 9 is a view showing an example of a relationship between each of wide paper and narrow paper and a head in the first embodiment.

Next, the maintenance content determination process (step S110 in FIG. 8) will be described in detail. Here, focusing on a case where the paper width changes at the replacement of the roll paper, the print paper having a wide paper width is referred to as "wide paper", and the print paper having a narrow paper width is referred to as "narrow paper". The wide paper is denoted by reference numeral 61, and the narrow paper is denoted by reference numeral 62. It is assumed that there are ten inkjet heads H1 to H10 (hereinafter abbreviated as "head H1" to "head H10"), and that the relationship between each of the wide paper 61 and the narrow paper 62 and the heads H1 to H10 is as shown in FIG. 9. A paper width of the wide paper 61 is W1, and a paper width of the narrow paper 62 is W2. The heads H1 to H10 are used for printing on the wide paper 61, and the heads H1 to H7 are used for printing on the narrow paper 62.

<1.5.3.1 Replacement of Wide Paper with Narrow Paper>

With reference to a flowchart shown in FIG. 10, the procedure for the maintenance content determination process when the wide paper 61 is replaced with the narrow paper 62 will be described. This maintenance content determination process is performed by the maintenance content control unit 151. In this case, after the replacement of the roll paper, since printing is performed on the narrow paper 62, the heads H1 to H7 are used. In this example, the heads H1 to H10 correspond to a first printhead group, the heads H1 to H7 correspond to a second printhead group, and the heads H8 to H10 correspond to a third printhead group. Here, it is assumed that there is a defect on each of the head H8 and the head H10 among the heads H8 to H10 not to be used after the replacement of the roll paper.

After the maintenance content determination process is started, first, the inspection result Dr (more specifically, the defect information LI which is the inspection result related to the defect among the inspection results Dr) for the inspection pattern printed at the tail of the preceding print paper (here, the wide paper 61) is acquired (step S200). Next, the paper information PI that is information such as a paper type and a paper width for each of the preceding print paper and the subsequent print paper (here, the narrow paper 62) is acquired (step S210). Furthermore, the job information JI, which is various types of information such as printing conditions for a job to be executed after the replacement of the roll paper, is acquired (step S220).

Next, based on the information of the paper width acquired in step S210, a head to be used after the replacement of the roll paper (hereinafter referred to as a "use head") and a head not to be used after the replacement of the roll paper (hereinafter referred to as a "non-use head") are specified (step S230). In this case, the heads H1 to H7 are specified as use heads, and the heads H8 to H10 are specified as non-use heads. Then, based on the inspection result Dr acquired in step S200, it is determined whether or not a defect is present on the use heads (step S240). As a result, when there is a defect on the use heads, the process proceeds to step S250. On the other hand, when there is no defect on the use heads, it is determined not to perform maintenance, and the maintenance content determination process ends.

In step S250, it is determined whether or not maintenance is necessary. Specifically, based on the inspection result Dr acquired in step S200, it is determined whether or not the maintenance of the use heads (the heads H1 to H7) is necessary in accordance with a criterion defined for printing on the narrow paper 62 (a criterion suitable for printing on the narrow paper 62). This determination is made, for example, based on a comparison result between the number of defects or the largest defect size and a predetermined threshold for the narrow paper 62 not for the wide paper 61. As a result, when it is determined that maintenance is necessary, the process proceeds to step S260. On the other hand, when it is determined that maintenance is not necessary, the maintenance content determination process ends. Note that the determination of the need for maintenance in step S250 is made not for each head but for the entire use heads (the entirety of the heads H1 to H7).

In step S260, a head to be a maintenance target is specified. In this case, a head having a defect among the use heads (heads H1 to H7) and a head having a defect among the non-use heads (heads H8 to H10) are set as a maintenance target. When there is a defect only in the head H1 among the use heads (heads H1 to H7), the heads H1, H8, and H10 are set as maintenance targets.

In step S270, based on the inspection result Dr acquired in step S200, it is determined whether or not cleaning is necessary for the heads that are maintenance targets in accordance with the criterion defined for printing on the narrow paper 62. Similarly to step S250, this determination is also made, for example, based on a comparison result between the number of defects or the largest defect size and a predetermined threshold for the narrow paper 62 not for the wide paper 61. As a result, when it is determined that cleaning is necessary, the process proceeds to step S272, and when it is determined that cleaning is not necessary, the process proceeds to step S274. When it is determined that cleaning is not necessary, flushing is performed. As above, the type of maintenance is determined in accordance with the criterion suitable for printing on the subsequent print paper (here, the narrow paper 62).

In step S272, the intensity at which cleaning is performed (cleaning intensity) is determined. In this regard, for example, the configuration may be such that the past inspection result is stored, and the cleaning intensity is determined based on the immediately preceding inspection result and the past inspection result. In addition, the cleaning intensity is determined in accordance with the criterion suitable for printing on the subsequent print paper (here, the narrow paper 62).

In step S274, the content of flushing is determined. In this regard, for example, the flushing amount and the number of flushing sheets (sheets on which a special pattern for improving defect is printed) are determined. The content of flushing is also determined in accordance with the criterion suitable for printing on the subsequent print paper (here, the narrow paper 62).

As above, in this example, only for the use heads, the printhead to be a maintenance target and the maintenance content (e.g., cleaning intensity and flushing content) are determined in accordance with the criterion suitable for printing on the subsequent print paper. Processing regarding the non-use heads will be described as follows. When there is a defect on the use heads and it is determined that maintenance is necessary in step S250, the non-use heads are included in the heads that are maintenance targets. On the other hand, when there is no defect on the use heads or when it is determined that maintenance is not necessary in step S250, maintenance is not performed on the non-use heads.

<1.5.3.2 Replacement of Narrow Paper with Wide Paper>

With reference to a flowchart shown in FIG. 11, a procedure for the maintenance content determination process when the narrow paper 62 is replaced with the wide paper 61 will be described. In this case, after the replacement of the roll paper, since printing is performed on the wide paper 61, the heads H1 to H10 are used. In this example, the heads H1 to H10 correspond to a fourth printhead group, the heads H1 to H7 correspond to a fifth printhead group, and the heads H8 to H10 correspond to a sixth printhead group.

After the maintenance content determination process is started, first, the inspection result Dr (more specifically, the defect information LI which is the inspection result related to the defect among the inspection result Dr) for the inspection pattern printed at the tail of the preceding print paper (here, the narrow paper 62) is acquired (step S300). Since the narrow paper 62 corresponds to the heads H1 to H7, the inspection result for the region corresponding to the heads H8 to H10 is not obtained. In step S310, the paper information PI is acquired similarly to step S210 in FIG. 10, and in step S320, the job information JI is acquired similarly to step S220 in FIG. 10.

Next, based on the paper width information acquired in step S310, a head to be used before the replacement of the roll paper (hereinafter referred to as a "used head") and a head not to be used before the replacement of the roll paper (hereinafter referred to as an "unused head") are specified (step S330). In this case, the heads H1 to H7 are specified as used heads, and the heads H8 to H10 are specified as unused heads.

Thereafter, it is determined whether or not the maintenance of the used head is necessary (step S340). Specifically, based on the inspection result Dr acquired in step S300, it is determined whether or not the maintenance of the used heads (the heads H1 to H7) is necessary in accordance with a criterion defined for printing on the wide paper 61 (a criterion suitable for printing on the wide paper 61). As a result, when it is determined that maintenance is necessary, the process proceeds to step S342, and when it is determined that maintenance is not necessary, the process proceeds to step S344.

In step S342, the head having a defect among the used heads (heads H1 to H7) and all the unused heads (heads H8 to H10) are set as a maintenance target. When there is a defect only in the head H1 among the used heads (heads H1 to H7), the head H1 and the heads H8 to H10 are set as a maintenance target.

In step S344, all the unused heads (heads H8 to H10) are set as a maintenance target.

In step S350, based on the inspection result Dr acquired in step S300, it is determined whether or not cleaning is necessary for the heads that are maintenance targets in accordance with a criterion defined for printing on the wide paper 61. As a result, when it is determined that cleaning is necessary, the process proceeds to step S352, and when it is determined that cleaning is not necessary, the process proceeds to step S354.

Figure 10:
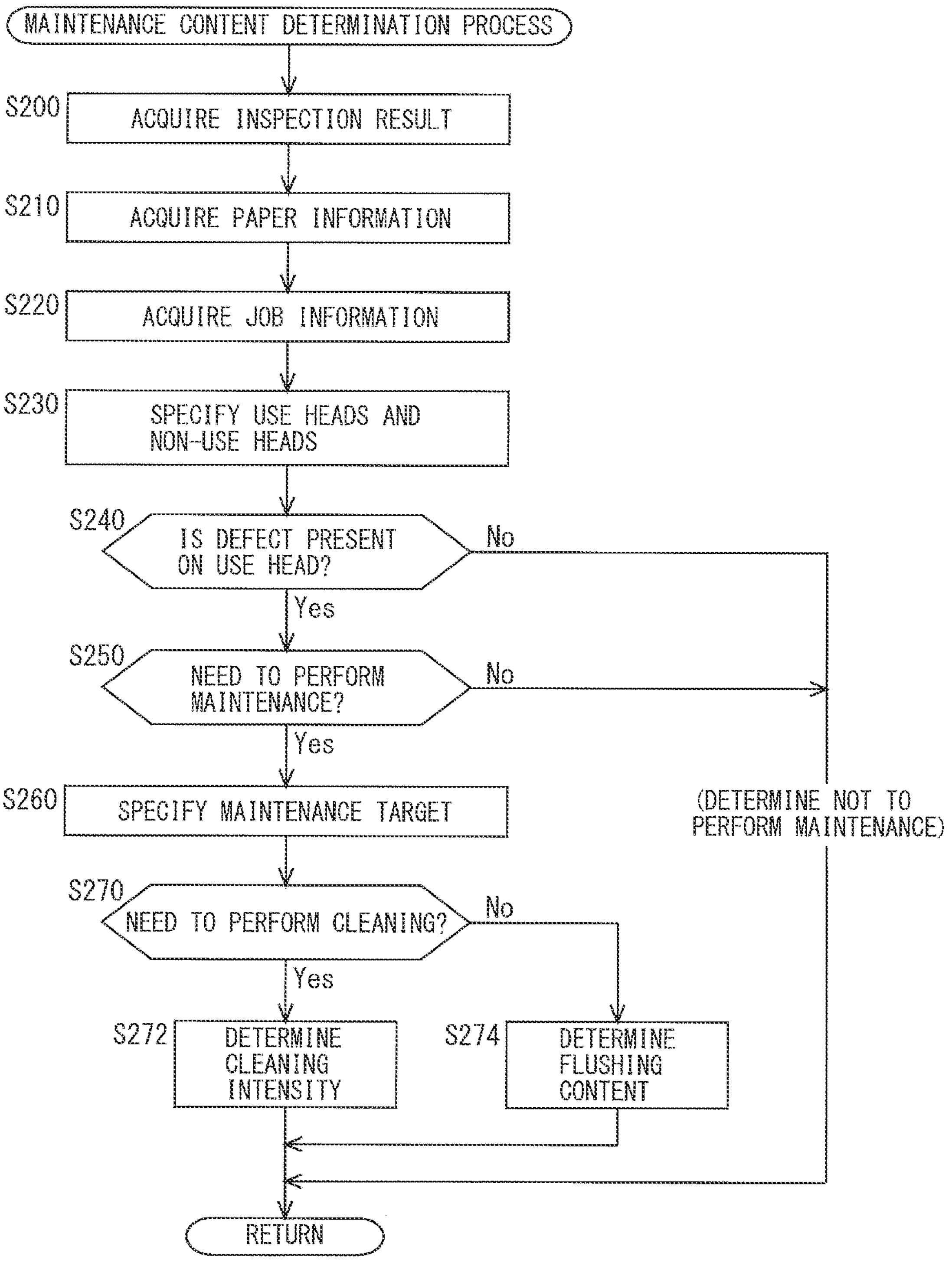
FIG. 10 is a flowchart showing a procedure for a maintenance content determination process when the wide paper is replaced with narrow paper in the first embodiment.

In step S352, the cleaning intensity is determined similarly to step S272 of FIG. 10, and in step S354, the content of flushing is determined similarly to step S274 of FIG. 10.

As above, in this example, only for the used heads, the printhead to be a maintenance target is determined in accordance with the criterion suitable for printing on the subsequent print paper. As for the unused heads, they are set as maintenance targets regardless of the need for the maintenance of the used heads.

<1.6 Effects>

According to the present embodiment, the control unit 150 of the inkjet printing apparatus 10 having an auto-splice function is provided with the maintenance content control unit 151 for determining the need for maintenance of the inkjet head 241, the inkjet head 241 to be a maintenance target; and the type of maintenance, and the maintenance mechanism control unit 154 for controlling the operations of the cleaning mechanism 25 and the flushing mechanism 242 in accordance with the content determined by the maintenance content control unit 151. When the splicer 213 replaces the roll paper to be used, the maintenance content control unit 151 determines the inkjet head 241 to be a maintenance target in accordance with a criterion suitable for printing on the subsequent print paper based on the inspection result for the inspection pattern. Accordingly, when the roll paper is replaced, maintenance is performed on the inkjet head 241 depending on the print process performed after the replacement. As above, according to the present embodiment, the inkjet printing apparatus 10 is achieved that has the auto-splice function and is capable of performing, when the roll paper is replaced, suitable maintenance taking into account the print process scheduled to be executed after the replacement.

Further, according to the present embodiment, at the time of replacing the wide paper 61 with the narrow paper 62, in a case where there is no defect on the inkjet head 241 to be used after the replacement of the roll paper, or in a case where there is a defect on the inkjet head 241 to be used after the replacement of the roll paper but maintenance of that inkjet head 241 is not necessary, maintenance is not performed for any of the inkjet heads 241. Thus, the printing time is reduced by preventing maintenance from being performed more than necessary.

Moreover, according to the present embodiment, when the narrow paper 62 is replaced with the wide paper 61, all the inkjet heads 241, which have not been used before the replacement of the roll paper, are set as a maintenance target. Since the maintenance is reliably performed on the inkjet head 241 that changes from the non-use state to the used state at the replacement of the roll paper in this manner, the occurrence of the ejection failure of the inkjet head 241 that has been in the non-use state is effectively inhibited.

Moreover, according to the present embodiment, cleaning and flushing are prepared as types of maintenance of the inkjet head 241. By appropriately using cleaning and flushing, it is possible to inhibit a decrease in printing efficiency while maintaining printing quality.

<1.7. Modifications>

In the description of the above embodiment, the focus has been on the case where the paper width changes at the replacement of the roll paper. However, the present invention can also be applied to other cases. Therefore, a case where switching between double-sided printing and single-sided printing is performed at the replacement of the roll paper will be described as a first modification, and a case where switching between color printing and monochrome printing is performed at the replacement of the roll paper will be described as a second modification. Note that, in the description of these modifications, the inkjet head is abbreviated as a "head".

<1.7.1 First Modification>

Figure 12:
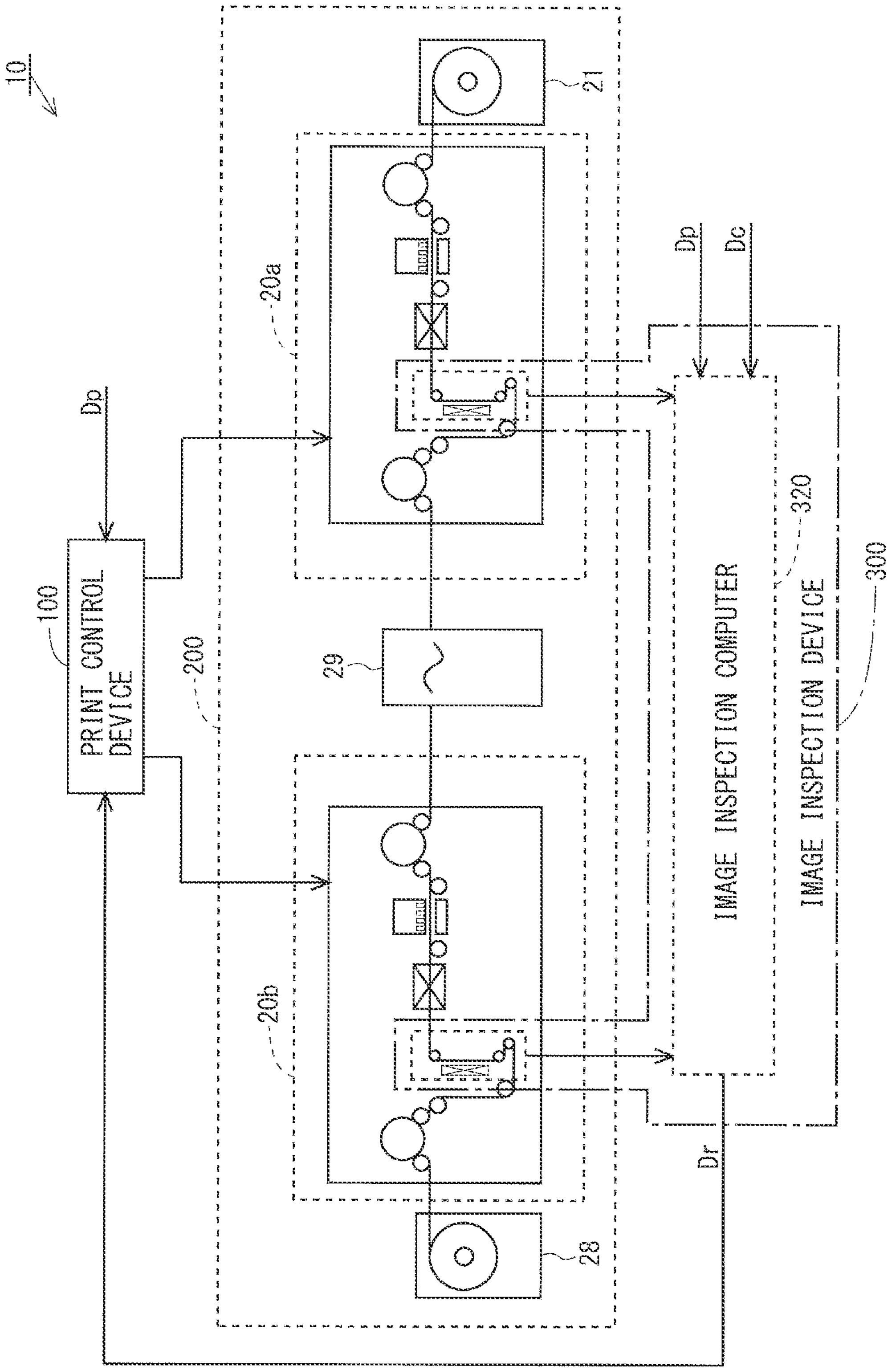
FIG. 12 is a schematic diagram showing a configuration example of an inkjet printing apparatus in a first modification of the first embodiment.

FIG. 12 a one is schematic diagram showing configuration example of the inkjet printing apparatus 10 in the present modification. In the present modification, the printer body 200 includes a paper feeding unit 21 for supplying print paper (roll paper), a first printing mechanism **20*a* for performing printing on the front surface of the print paper, a reversing unit 29 for reversing the front surface and the back surface of the print paper outputted from the first printing mechanism 20*a*, a second printing mechanism 20*b* for performing printing on the back surface of the print paper, and a paper winding unit 28 for winding the print paper after printing. The internal configuration of each of the first printing mechanism 20*a* and the second printing mechanism 20*b* is similar to the internal configuration of the printing mechanism 20** in the above embodiment. Since printing can be performed on both the front surface of the print paper and the back surface of the print paper as above, switching between double-sided printing and single-sided printing is also possible.

When single-sided printing is performed, the ejection of ink from the printing unit to the print paper is stopped in either the first printing mechanism **20*a* or the second printing mechanism 20*b*. That is, heads are used in both the first printing mechanism 20*a* and the second printing mechanism 20*b* when double-sided printing is performed, whereas heads are used only in either the first printing mechanism 20*a* or the second printing mechanism 20*b* when single-sided printing is performed. In this manner, when single-sided printing is performed, some of the plurality of heads used when double-sided printing is performed are used. Therefore, "switching from double-sided printing to single-sided printing" at the replacement of the roll paper corresponds to "replacement of the wide paper 61 with the narrow paper 62" in the first embodiment, and "switching from single-sided printing to double-sided printing" at the replacement of the roll paper corresponds to "replacement of the narrow paper 62 with the wide paper 61**" in the first embodiment.

When double-sided printing is switched to single-sided printing at the replacement of the roll paper, the maintenance content determination process is executed in the same procedure as in the "replacement of the wide paper 61 with the narrow paper 62" in the first embodiment (cf. FIG. 10). Thus, in a case where there is no defect on the heads that are used in single-sided printing, and in a case where it is determined that maintenance is not necessary in accordance with the criterion suitable for single-sided printing with respect to the heads that are used in single-sided printing, maintenance is not performed on the heads when roll paper is replaced. On the other hand, in a case where there is a defect on the heads that are used in single-sided printing and it is determined that maintenance is necessary in accordance with the criterion suitable for single-sided printing with respect to the heads that are used in single-sided printing, maintenance is performed on the head having a defect among the plurality of heads that are used in single-sided printing, and maintenance is performed on the head having a defect among the plurality of heads that are used in both single-sided printing and double-sided printing. Note that, in this example, a set of heads that are used in double-sided printing corresponds to the first printhead group, a set of heads that are used in single-sided printing corresponds to the second printhead group, and a set of heads that are used only when double-sided printing is performed corresponds to the third printhead group.

Figure 11:
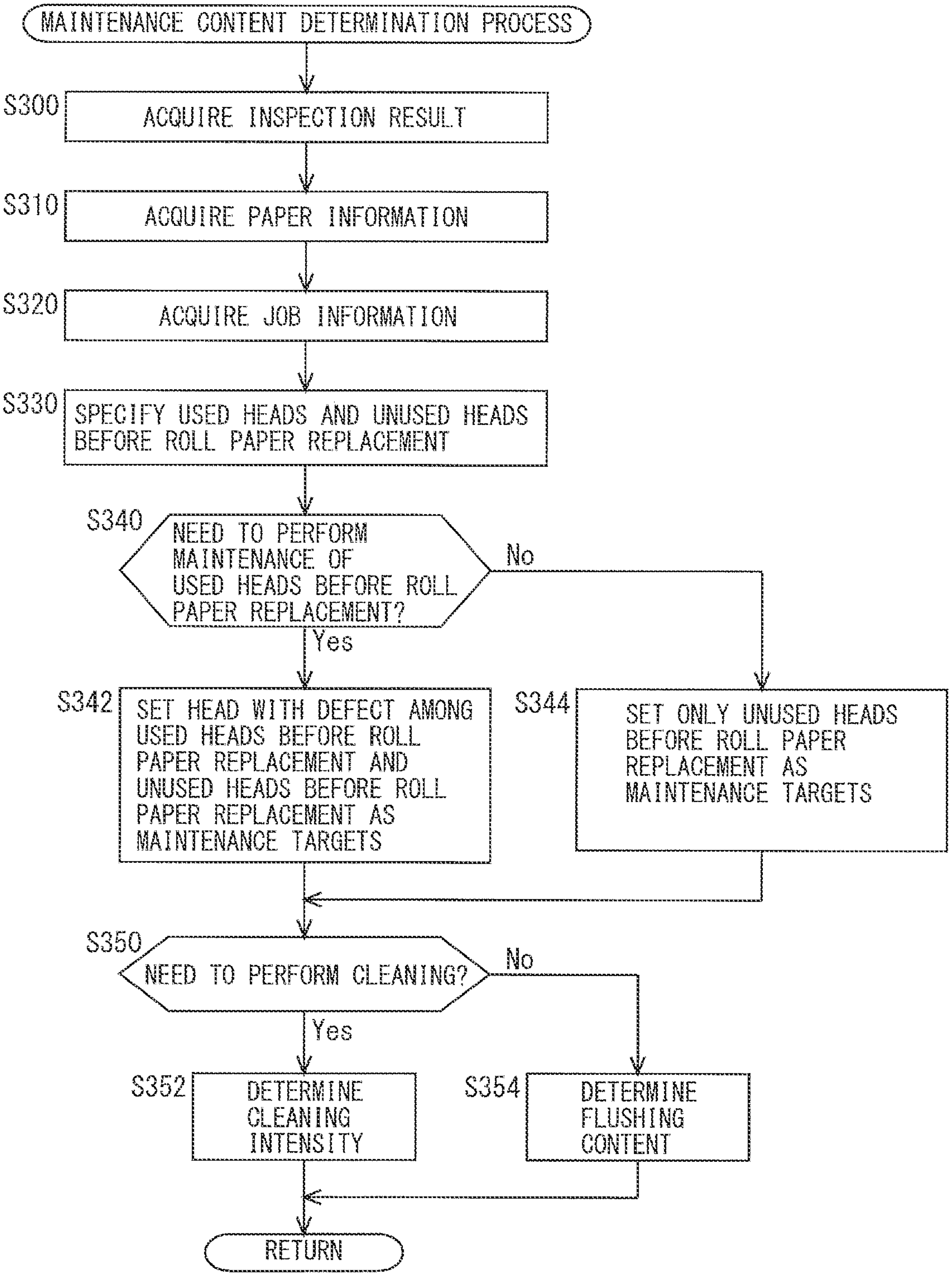
FIG. 11 is a flowchart showing a procedure for a maintenance content determination process when the narrow paper is replaced with wide paper in the first embodiment.

When single-sided printing is switched to double-sided printing at the replacement of the roll paper, the maintenance content determination process is executed in the same procedure as in the "replacement of the narrow paper 62 with the wide paper 61" in the first embodiment (cf. FIG. 11). As a result, in a case where it is determined that maintenance is necessary in accordance with the criterion suitable for double-sided printing with respect to the heads that are used in single-sided printing, maintenance is performed on the head having a defect among the plurality of heads that are used in single-sided printing, and maintenance is performed on all the heads that are used in both single-sided printing and double-sided printing. On the other hand, in a case where it is determined that maintenance is not necessary in accordance with the criterion suitable for double-sided printing with respect to the heads that are used in single-sided printing, maintenance is performed only on all heads that are used in both single-sided printing and double-sided printing. Note that, in this example, a set of heads that are used in double-sided printing corresponds to the fourth printhead group, a set of heads that are used in single-sided printing corresponds to the fifth printhead group, and a set of heads that are used only when double-sided printing is performed corresponds to the sixth printhead group.

As above, according to the present modification as well, in the inkjet printing apparatus 10 having the auto-splice function, when the roll paper is replaced, suitable maintenance is performed taking into account the print process scheduled to be executed after the replacement.

<1.7.2 Second Modification>

When the printing unit 24 having the configuration as shown in FIG. 3 is adopted, regarding monochrome printing, there are a case where only the K color ink is used and a case where the C color ink, the M color ink, the Y color ink, and the K color ink are used. However, in the present modification, it is assumed that only the K color ink is used at the time of performing monochrome printing.

For color printing, C color ink, M color ink, Y color ink, and K color ink are used. That is, when color printing is performed, a head for ejecting the C color ink (hereinafter referred to as a "C color head"), a head for ejecting the M color ink (hereinafter referred to as an "M-color head"), a head for ejecting the Y color ink (hereinafter referred to as a "Y color head"), and a head for ejecting the K color ink (hereinafter referred to as a "K color head") are used. In the present modification, only the K color head is used when monochrome printing is performed. Thus, when monochrome printing is performed, some of the plurality of heads used when color printing is performed are used. Therefore, "switching from color printing to monochrome printing" at the replacement of the roll paper corresponds to "replacement of the wide paper 61 with the narrow paper 62" in the first embodiment, and "switching from monochrome printing to color printing" at the replacement of the roll paper corresponds to "replacement of the narrow paper 62 with the wide paper 61" in the first embodiment.

When color printing is switched to monochrome printing at the replacement of the roll paper, the maintenance content determination process is executed in the same procedure as in the "replacement of the wide paper 61 with the narrow paper 62" in the first embodiment (cf. FIG. 10). As a result, in a case where there is no defect on the K color head, and in a case where it is determined that maintenance is not necessary in accordance with the criterion suitable for monochrome printing with respect to the K color head, maintenance is not performed on the head at all when the roll paper is replaced. On the other hand, in a case where there is a defect on the K color head and it is determined that maintenance is necessary in accordance with the criterion suitable for monochrome printing with respect to the K color head, maintenance is performed on the head having a defect among the plurality of K color heads, and maintenance is performed on the head having a defect among the plurality of C color heads, the plurality of M color heads, and the plurality of Y color heads. Note that, in this example, a set of heads that are used in color printing corresponds to the first printhead group, a set of heads that are used in monochrome printing corresponds to the second printhead group, and a set of heads that are used only when color printing is performed corresponds to the third printhead group.

When monochrome printing is switched to color printing at the replacement of the roll paper, the maintenance content determination process is executed in the same procedure as in the "replacement of the narrow paper 62 with the wide paper 61" in the first embodiment (cf. FIG. 11). Accordingly, in a case where it is determined that maintenance is necessary in accordance with the criterion suitable for color printing with respect to the K color head, maintenance is performed on the head having a defect among the plurality of K color heads, and maintenance is performed on all the C color heads, all the M color heads, and all the Y color heads. On the other hand, in a case where it is determined that maintenance is not necessary in accordance with the criterion suitable for color printing with respect to the K color head, maintenance is performed on all the C color heads, all the M color heads, and all the Y color heads. Note that, in this example, a set of heads that are used in color printing corresponds to the fourth printhead group, a set of heads that are used in monochrome printing corresponds to the fifth printhead group, and a set of heads that are used only when color printing is performed corresponds to the sixth printhead group.

When monochrome printing is switched to color printing at the replacement of the roll paper, the inspection pattern may be printed at the tail of the print paper for monochrome printing, which is the preceding print paper, using the C color head, the M color head, the Y color head, and the K color head. In this case, inspection patterns of C color, M color, Y color, and K color are formed on the print paper for monochrome printing. The configuration may be such that these inspection patterns are read and a head of a color requiring maintenance and the maintenance content for a head of a color requiring maintenance are determined based on the read result of the inspection pattern. By performing such control, it is possible to determine the need for maintenance of each head and the content of the maintenance on the basis of the criterion suitable for printing on the subsequent print paper during a period in which printing on the preceding print paper is performed. Therefore, it is possible to reliably perform printing with high print quality from the head part of the subsequent print paper.

As above, according to the present modification as well, in the inkjet printing apparatus 10 having the auto-splice function, when the roll paper is replaced, suitable maintenance is performed taking into account the print process scheduled to be executed after the replacement.

Note that, although the second modification relates to a case where switching is made between color printing and monochrome printing at the replacement of the roll paper, the same control can be adopted for a case where switching is made between printing using a spot color head and printing not using a spot color head at the replacement of the roll paper. For example, when normal color printing not using a spot color is switched to color printing using spot color, an inspection pattern is printed at the tail of print paper for normal color printing, which is the preceding print paper, by using the heads of normal C, M, Y, and K colors and the head of the spot color that is used on the subsequent print paper. The configuration may be such that the inspection patterns of C, M, Y, and K colors and the spot color is read and a head of a color requiring maintenance and the maintenance content for a head of a color requiring maintenance are determined based on the read result.

2. Second Embodiment

<2.1 Outline and Configuration>

In the inkjet printing apparatus, continuous printing based on a plurality of jobs may be performed. When continuous printing is underway, a plurality of jobs can be print targets in a period from when the roll paper is replaced to when the roll paper is replaced next. A criterion used at the time of determining the content of maintenance (the need for maintenance, inkjet head 241 to be a maintenance target, type of maintenance, etc.) may be defined for each job. In consideration of the above, an embodiment in which the criterion is defined for each job and continuous printing based on a plurality of jobs is executed will be described as a second embodiment.

In the present embodiment, at the time of determining the content of maintenance to be performed when the preceding roll paper is replaced with the subsequent roll paper regarding the roll paper to be used, the strictest criterion (a criterion for maximizing the number of inkjet heads 241 determined as maintenance targets) is used among the criteria defined for a plurality of jobs for which printing is performed before, regarding the roll paper to be used, the subsequent roll paper is further replaced with the next roll paper.

The overall configuration of the printing system, the configuration of the inkjet printing apparatus 10, the configuration of the printing unit 24, the configuration related to the auto-splice function, the hardware configuration of the print control device 100, the schematic functional configuration of the control unit 150, and the functional configuration related to maintenance are similar to those of the first embodiment, and hence the description thereof is omitted (cf. FIGS. 1 to 7).

<2.2 Maintenance Control>

Figure 13:
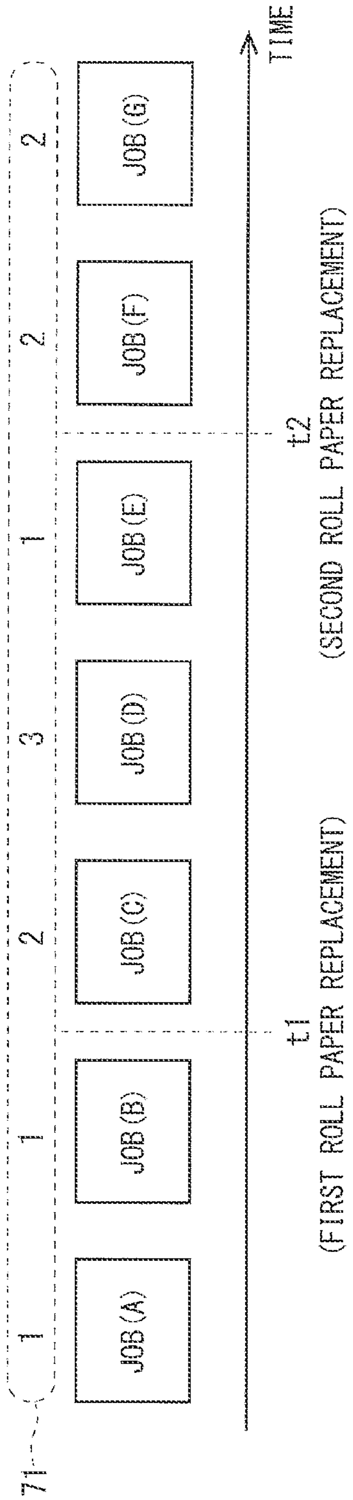
FIG. 13 is a diagram showing an example of a relationship between a job and a criterion in a second embodiment of the present invention.

Hereinafter, control of maintenance in the present embodiment will be described. Here, the focus is on maintenance that is performed at the time of a first replacement of the roll paper in a case where the first replacement of the roll paper is performed at time t1 and a second replacement of the roll paper is performed at time t2, as shown in FIG. 13. In this regard, it is assumed that printing based on each of job (C), job (D), and job (E) is scheduled to be performed in a period when the first replacement of the roll paper is performed to when the second replacement of the roll paper is performed. In FIG. 13, the level of the criterion for each job is written using a numerical value in a portion denoted by reference numeral 71, and it is assumed that the higher the numerical value, the higher the possibility that maintenance is determined to be necessary.

According to FIG. 13, the level of the criterion for job (C) is 2, the level of the criterion for job (D) is 3, and the level of the criterion for job (E) is 1. The strictest criterion among the criteria for the three jobs is the criterion for job (D). Therefore, in the example shown in FIG. 13, the content of the maintenance to be performed at the time of the first replacement of the roll paper is determined in accordance with the criterion for job (D).

Figure 14:
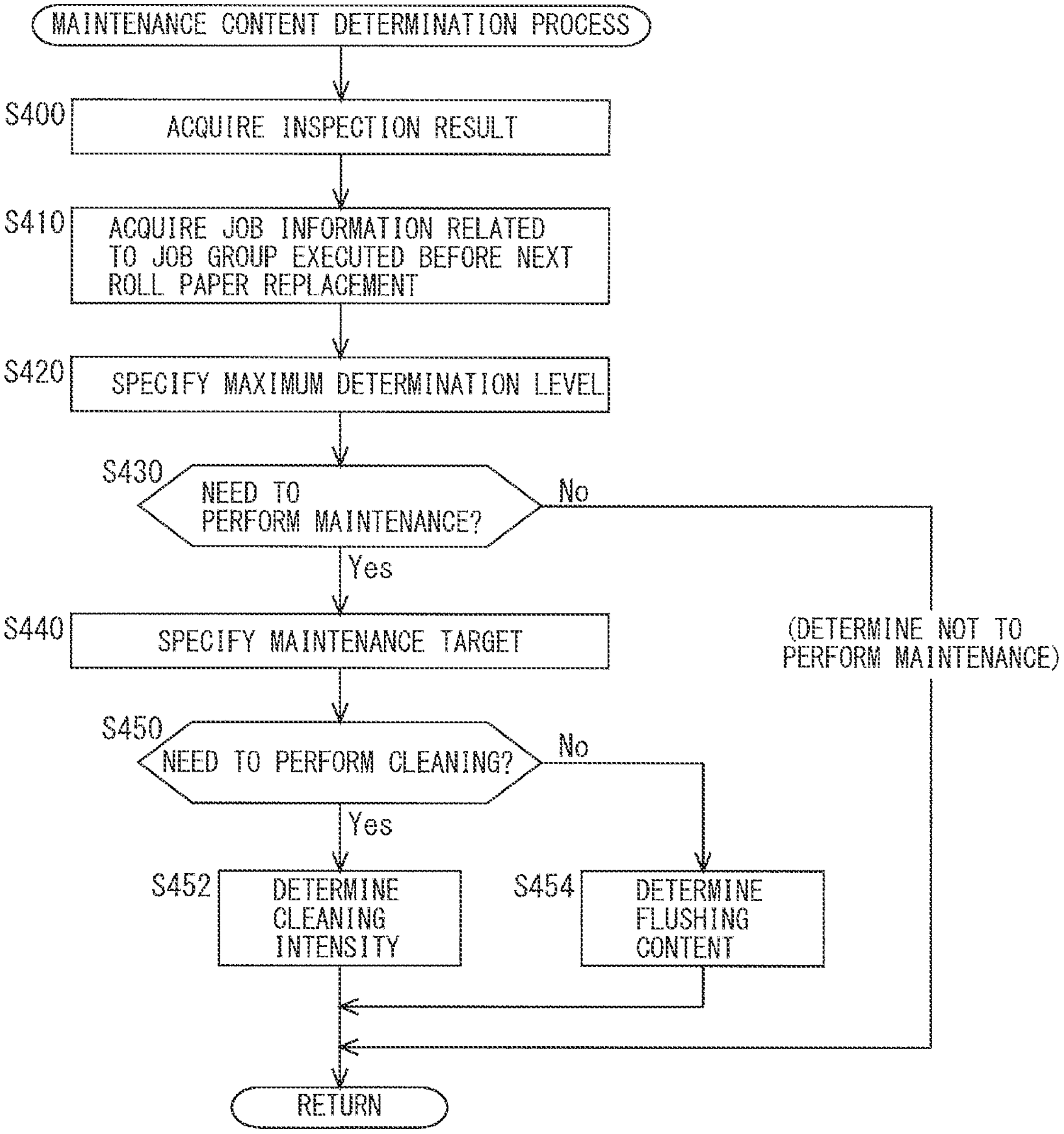
FIG. 14 is a flowchart showing a procedure for a maintenance content determination process in the second embodiment.

With reference to a flowchart shown in FIG. 14, a procedure for the maintenance content determination process according to the present embodiment will be described. In the present embodiment as well, the maintenance content determination process is performed by the maintenance content control unit 151.

After the maintenance content determination process is started, first, the inspection result Dr for the inspection pattern printed at the tail of the preceding print paper is acquired (step S400).

Thereafter, job information JI related to a job group (a plurality of jobs) to be executed before the next replacement of the roll paper is acquired (step S410). Here, the job information JI related to the job group for which printing is scheduled to be performed in a period from when the first replacement of the roll paper is performed to when the second replacement of the roll paper is performed is acquired. That is, the job information JI related to job (C), job (D), and job (E) is acquired. Note that the job information JI includes information such as printing conditions.

Next, the level of the criterion for each job is acquired based on the job information JI, and the maximum level among the acquired levels is specified (step S420). Here, the level of the criterion for each of job (C), job (D), and job (E) is acquired, and 3, which is the level of the criterion for job (D), is specified as the maximum level.

Next, it is determined whether or not maintenance is necessary (step S430). Specifically, based on the inspection result Dr acquired in step S400, it is determined, for example, whether or not maintenance of the inkjet head 241 used at the time of printing based on each of job (C), job (D), and job (E) is necessary in accordance with the criterion for job (D). As a result, when it is determined that maintenance is necessary, the process proceeds to step S440. On the other hand, when it is determined that maintenance is not necessary, it is determined not to perform maintenance, and the maintenance content determination process ends.

In step S440, the inkjet head 241 to be a maintenance target is specified. For example, the inkjet head 241 having a defect among the inkjet heads 241 used at the time of printing based on job (C), job (D), and job (E) is set as a maintenance target.

Thereafter, based on the inspection result Dr acquired in step S400, it is determined whether or not cleaning is necessary for the inkjet head 241 that is a maintenance target in accordance with the criterion for job (D). As a result, when it is determined that cleaning is necessary, the process proceeds to step S452, and when it is determined that cleaning is not necessary, the process proceeds to step S454. When it is determined that cleaning is not necessary, flushing is performed.

In step S452, the cleaning intensity is determined similarly to step S272 of FIG. 10, and in step S454, the content of flushing is determined similarly to step S274 of FIG. 10.

<2.3 Effects>

According to the present embodiment, in the inkjet printing apparatus 10 having an auto-splice function, when the splicer 213 replaces the roll paper to be used, the maintenance content control unit 151 determines the inkjet head 241 to be a maintenance target in accordance with the strictest criterion among the criteria defined for a plurality of jobs for which printing is scheduled to be performed before the next replacement of the roll paper. Accordingly, when the roll paper is replaced, maintenance is performed on the inkjet head 241 depending on the print process performed after the replacement. As above, similarly to the first embodiment, according to the present embodiment, the inkjet printing apparatus 10 is achieved that has the auto-splice function and is capable of performing, when the roll paper is replaced, suitable maintenance taking into account the print process scheduled to be executed after the replacement.

<3. Others>

The present invention is not limited to the above embodiments, and various modifications can be made without departing from the gist of the present invention. For example, although either cleaning or flushing is performed as maintenance of the printing unit 24 in each of the above embodiments, the present invention is not limited thereto, and both cleaning and flushing may be performed as maintenance of the printing unit 24.

DESCRIPTION OF REFERENCE CHARACTERS

10: INKJET PRINTING APPARATUS
24: PRINTING UNIT
25: CLEANING MECHANISM
100: PRINT CONTROL DEVICE
150: CONTROL UNIT
151: MAINTENANCE CONTENT CONTROL UNIT
153: PRINT CONTROL UNIT
154: MAINTENANCE MECHANISM CONTROL UNIT
157: INSPECTION RESULT HOLDING UNIT
158: JOB INFORMATION HOLDING UNIT
200: PRINTER BODY
213: SPLICER
241: INKJET HEAD
242: FLUSHING MECHANISM
250: MAINTENANCE MECHANISM
300: IMAGE INSPECTION DEVICE
310: IMAGING UNIT
320: IMAGE INSPECTION COMPUTER
ST: SPLICE TRIGGER SIGNAL

The invention claimed is:

1. A printing apparatus comprising:

a printing unit including a printhead that performs printing by ejecting ink onto continuous paper unwound from roll paper;

a print control unit configured to control an operation of the printing unit;

a maintenance mechanism configured to perform maintenance of the printhead;

an inspection device configured to perform inspection of a print image obtained by printing by the printing unit;

a maintenance content control unit configured to determine maintenance content for the printhead;

a maintenance mechanism control unit configured to control an operation of the maintenance mechanism such that maintenance based on the maintenance content determined by the maintenance content control unit is performed on the printhead; and a splicing unit configured to splice a tail end part of preceding roll paper to be used currently and a start end point of subsequent roll paper to be used next, and replace, regarding roll paper to be used, the preceding roll paper with the subsequent roll paper, wherein when the splicing unit replaces, regarding roll paper to be used, the preceding roll paper with the subsequent roll paper, the print control unit controls the operation of the printing unit such that an inspection pattern is printed at a tail of continuous paper unwound from the preceding roll paper, and the maintenance content control unit determines the maintenance content for the printhead in accordance with a criterion suitable for printing on continuous paper unwound from the subsequent roll paper based on an inspection result obtained by the inspection of a print image for the inspection pattern performed by the inspection device.

2. The printing apparatus according to claim 1, wherein when a part of a first printhead group that is a set of printheads to be used before the splicing unit replaces roll paper is not used after the splicing unit replaces roll paper, the maintenance content control unit determines the maintenance content only for a second printhead group that is a set of printheads to be used after the splicing unit replaces the roll paper, in accordance with the criterion suitable for printing on continuous paper unwound from the subsequent roll paper.

3. The printing apparatus according to claim 2, wherein a defect of a printhead is detected by the inspection performed by the inspection device, and unless the second printhead group includes a printhead in which a defect has been detected by the inspection performed by the inspection device, the maintenance content control unit determines that none of the printheads is a maintenance target.

4. The printing apparatus according to claim 2, wherein when the second printhead group includes a printhead in which a defect has been detected by the inspection performed by the inspection device, the maintenance content control unit determines whether or not maintenance of the second printhead group is necessary, and in a case where it is determined that the maintenance of the second printhead group is necessary, the maintenance content control unit determines that a printhead in which a defect has been detected by the inspection performed by the inspection device in the second printhead group and a printhead in which a defect has been detected by the inspection performed by the inspection device in a third printhead group that is a set of printheads not to be used after the splicing unit replaces roll paper are maintenance targets, and in a case where it is determined that the maintenance of the second printhead group is not necessary, the maintenance content control unit determines that none of the printheads is a maintenance target.

5. The printing apparatus according to claim 2, wherein a paper width of the subsequent roll paper is narrower than a paper width of the preceding roll paper.

6. The printing apparatus according to claim 2, wherein the first printhead group is a set of printheads that are used in color printing, and the second printhead group is a set of printheads that are used in monochrome printing.

7. The printing apparatus according to claim 2, wherein the first printhead group is a set of printheads that are used in double-sided printing, and the second printhead group is a set of printheads that are used in single-sided printing.

8. The printing apparatus according to claim 1, wherein a fourth printhead group that is a set of printheads to be used after the splicing unit replaces roll paper includes a fifth printhead group that is a set of printheads to be used before the splicing unit replaces the roll paper and a sixth printhead group that is a set of printheads not to be used before the splicing unit replaces roll paper, and the maintenance content control unit determines that all the printheads included in the sixth printhead group are maintenance targets.

9. The printing apparatus according to claim 8, wherein the maintenance content control unit determines a printhead to be a maintenance target in accordance with the criterion suitable for printing on continuous paper unwound from the subsequent roll paper, only for the fifth printhead group.

10. The printing apparatus according to claim 8, wherein a paper width of the subsequent roll paper is wider than a paper width of the preceding roll paper.

11. The printing apparatus according to claim 8, wherein the fifth printhead group is a set of printheads that are used in monochrome printing, and the fourth printhead group is a set of printheads that are used in color printing.

12. The printing apparatus according to claim 8, wherein the fifth printhead group is a set of printheads that are used in single-sided printing, and the fourth printhead group is a set of printheads that are used in double-sided printing.

13. The printing apparatus according to claim 1, wherein the criterion is defined for each job, and the maintenance content control unit determines a printhead to be a maintenance target in accordance with a criterion that maximizes the number of printheads determined as maintenance targets, among criteria defined for a plurality of jobs for which printing is to be performed by the printing unit after the splicing unit replaces, regarding roll paper to be used, the preceding roll paper with the subsequent roll paper and before the splicing unit further replaces, regarding roll paper to be used, the subsequent roll paper with a next roll paper.

14. The printing apparatus according to claim 1, wherein the print control unit controls the operation of the printing unit such that an inspection pattern is printed at a head of continuous paper unwound from the subsequent roll paper, and the maintenance content control unit further determines whether or not to stop printing by the printing unit on continuous paper unwound from the subsequent roll paper based on an inspection result obtained by the inspection, that is performed by the inspection device, of a print image for the inspection pattern printed at head of continuous paper unwound from the subsequent roll paper.

15. The printing apparatus according to claim 1, wherein cleaning and flushing are prepared as types of maintenance of the printhead, and the maintenance content control unit further determines a type of maintenance to be performed in accordance with the criterion suitable for printing on continuous paper unwound from the subsequent roll paper.

16. The printing apparatus according to claim 1, wherein the splicing unit outputs a splice trigger signal that triggers replacement of roll paper when a remaining amount of the preceding roll paper becomes equal to or less than a predetermined threshold, and the print control unit controls the operation of the printing unit based on the splice trigger signal such that an inspection pattern is printed at a tail of continuous paper unwound from the preceding roll paper.

17. A maintenance method of a printing apparatus that includes a printing unit including a printhead that performs printing by ejecting ink onto continuous paper unwound from roll paper, and a splicing unit configured to splice a tail end part of preceding roll paper to be used currently and a start end part of subsequent roll paper to be used next, and replace, regarding roll paper to be used, the preceding roll paper with the subsequent roll paper, the maintenance method comprising:

an inspection pattern printing step of printing, by the printing unit, an inspection pattern at a tail of continuous paper unwound from the preceding roll paper;

an inspection step of performing inspection of a print image for the inspection pattern;

a roll paper replacement step of replacing, by the splicing unit, the preceding roll paper with the subsequent roll paper, regarding roll paper to be used;

a maintenance content control step of determining maintenance content for the printhead in accordance with a criterion suitable for printing on continuous paper unwound from the subsequent roll paper based on an inspection result obtained by the inspection in the inspection step; and a maintenance step of performing maintenance based on the maintenance content determined in the maintenance content control step on the printhead.

* * * * *